US012738963B2

(12) United States Patent
Pietraski et al.

(10) Patent No.: US 12,738,963 B2
(45) Date of Patent: Sep. 15, 2026

(54) PROCESSING TECHNIQUES TO COEXIST WITH HIGH POWER PULSED INTERFERERS

(71) Applicant: INTERDIGITAL PATENT HOLDINGS, INC., Wilmington, DE (US)

(72) Inventors: Philip Pietraski, Jericho, NY (US); Joshua Ranstrom, Bradenton, FL (US); Sudhir Pattar, Mount Laurel, NJ (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 437 days.

(21) Appl. No.: 18/298,618

(22) Filed: Apr. 11, 2023

(65) Prior Publication Data

US 2023/0327695 A1 Oct. 12, 2023

Related U.S. Application Data

(60) Provisional application No. 63/329,646, filed on Apr. 11, 2022.

(51) Int. Cl.
*H04B 1/12* (2006.01)

(52) U.S. Cl.
CPC .................................. *H04B 1/123* (2013.01)

(58) Field of Classification Search
CPC ..................................................... H04B 1/123
See application file for complete search history.

(56) References Cited

U.S. PATENT DOCUMENTS

2024/0107525 A1* 3/2024 Khan Beigi .......... H04L 5/1469
2025/0358075 A1* 11/2025 Huang .................. H04B 1/715

OTHER PUBLICATIONS

Gao et al., "Protecting GNSS Receivers From Jamming and Interference," Proceedings of the IEEE, vol. 104, No. 6, pp. 1327-1338 (Jun. 2016).

(Continued)

*Primary Examiner* — Diane D Mizrahi
(74) *Attorney, Agent, or Firm* — Volpe Koenig

(57) ABSTRACT

Methods and apparatuses are described herein for processing techniques to coexist with high-power pulsed interferers. A wireless transmit/receive unit (WTRU) may receive, from a base station (BS) or an external radar detector, a message that includes a plurality of interference descriptor parameters indicating time domain information of one or more interference signals. The plurality of interference descriptor parameters may include a reference pulse time/delay, a pulse width, and a pulse repetition frequency (PRF). The WTRU may set, from a plurality of input signals, using the time domain information determined based on the reference pulse time/delay, the pulse width, and the PRF, one or more interfered signal samples in the plurality of input signals to zero. The WTRU may decode an output signal generated from the plurality of input signals. The output signal may include one or more signal samples and the one or more interfered signal samples set to zero.

16 Claims, 18 Drawing Sheets

(56) References Cited

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
Misra et al., "Microwave Radiometer Radio-Frequency Interference Detection Algorithms: A Comparative Study," IEEE Transactions on Geoscience and Remote Sensing, vol. 47, p. 3742-3754 (2009).
Sanders et al., "Analysis and Resolution of RF Interference to Radars Operating in the Band 2700-2900 MHz from Broadband Communication Transmitters," U.S. Dept. of Commerce, Tech. Rep. NTIA Technical Report TR-13-490 (2012).
Teja, "Multiplexer (MUX) and Multiplexing," Electronics Hub (Apr. 12, 2021) available at https://www.electronicshub.org/multiplexerandmultiplexing/.
Zhidkov, "Analysis and comparison of several simple impulsive noise mitigation schemes for OFDM receivers," IEEE Transactions on Communications, vol. 56, pp. 5-9 (Jan. 2008).

* cited by examiner

Figure 1C:
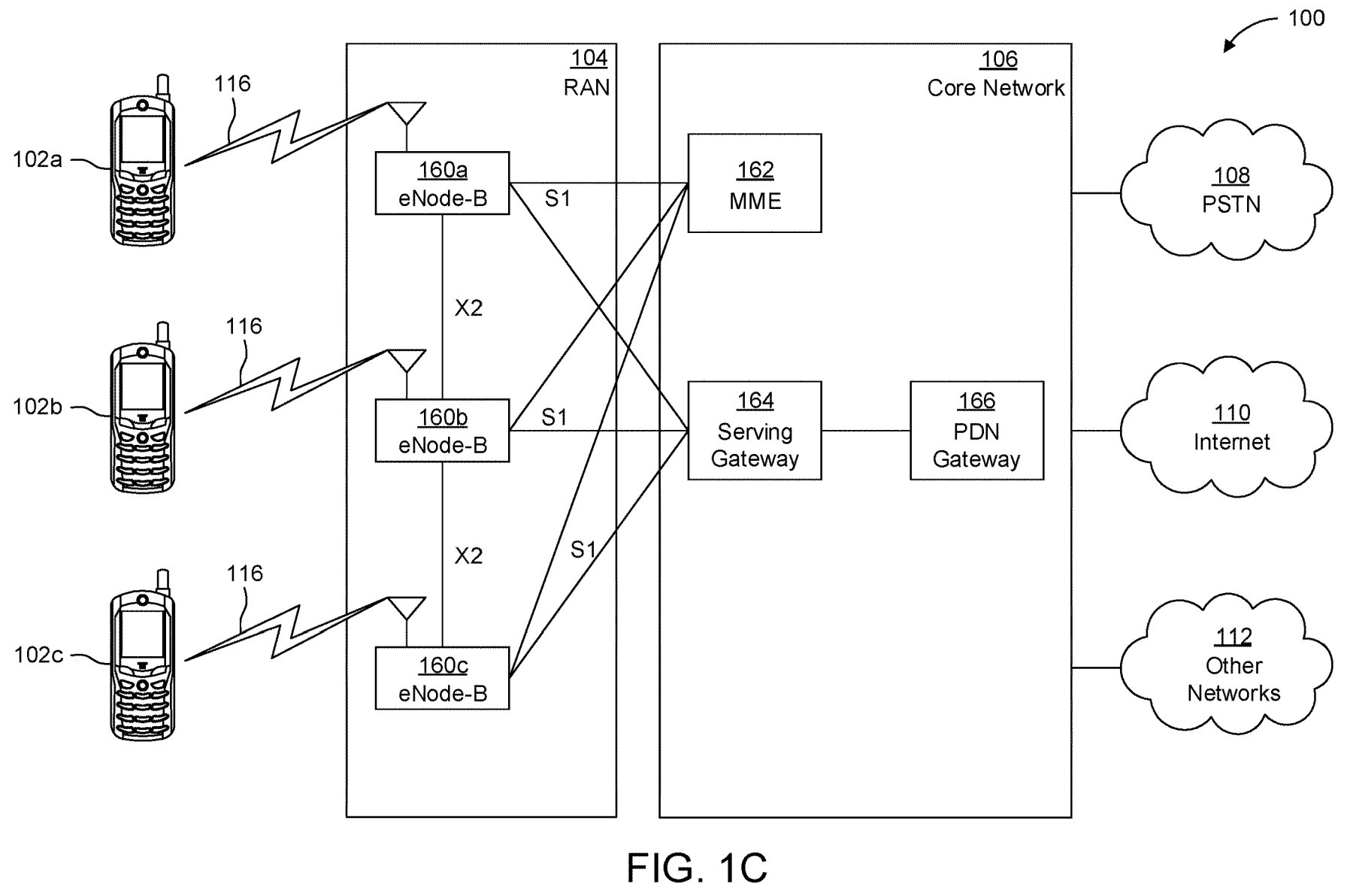

100

108 PSTN

110 Internet

112 Other Networks

106 Core Network

162 MME

164 Serving Gateway

166 PDN Gateway

104 RAN 160a eNode-B 160b eNode-B 160c eNode-B

Figure 1D:
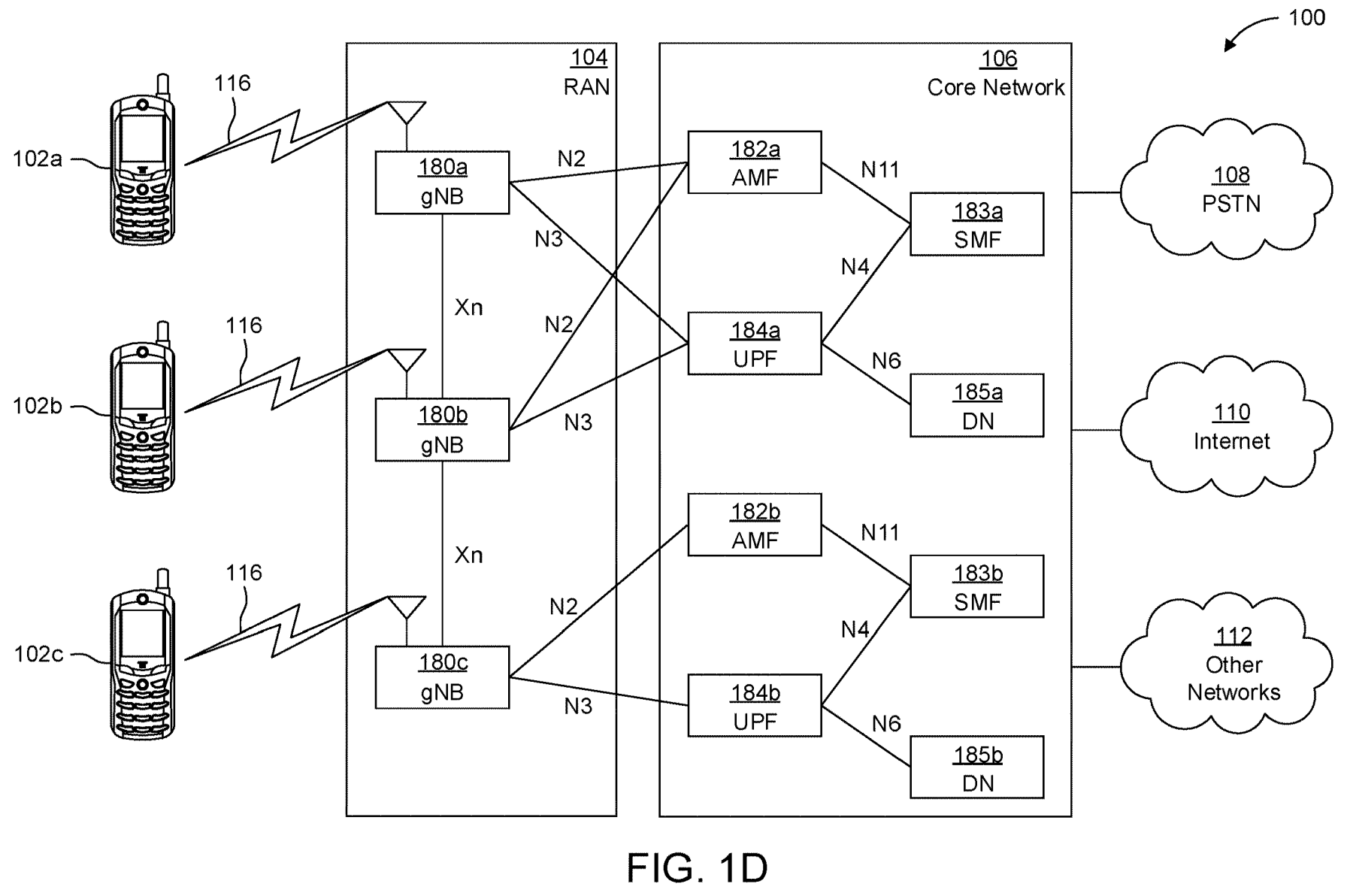

108 PSTN

110 Internet

112 Other Networks

106 Core Network

182a AMF

183a SMF

184a UPF

185a DN

182b AMF

183b SMF

184b UPF

185b DN

N11

N4

N6

104 RAN 180a gNB 180b gNB 180c gNB

PROCESSING TECHNIQUES TO COEXIST WITH HIGH POWER PULSED INTERFERERS

CROSS-REFERENCE TO RELATED APPLICATION

This application claims the benefit of U.S. Provisional Application No. 63/329,646, filed Apr. 11, 2022, the contents of each are incorporated herein by reference.

BACKGROUND

The current fifth generation (5G) wireless systems are largely designed to operate in licensed frequency bands that are dedicated for use by 5G deployments. As such, there is no expectation of coexistence with high powered interferers such as Airborne Early Warning and Control Systems (AWACS) Radar. More generally, 5G technology was not designed for operation in the presence of high-powered pulsed interferers and has related jamming vulnerabilities. Coexistence of 5G with other systems operating in the same band as 5G, requires advanced signal processing techniques to mitigate the interference.

SUMMARY

Methods and apparatuses are described herein for processing techniques to coexist with high-power pulsed interferers. For example, a wireless transmit/receive unit (WTRU) may receive, from a base station (BS) or an external radar detector, a message that includes a plurality of interference descriptor parameters indicating time domain information of one or more interference signals. The plurality of interference descriptor parameters may include a reference pulse time/delay, a pulse width, and a pulse repetition frequency (PRF). The WTRU may set, from a plurality of input signals, using the time domain information determined based on the reference pulse time/delay, the pulse width, and the PRF, one or more interfered signal samples in the plurality of input signals to zero (0). The WTRU may decode an output signal generated from the plurality of input signals. The output signal before decoding may include one or more signal samples and the one or more interfered signal samples set to zero (0).

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN) that may be used within the communications system illustrated in FIG. 1A according to an embodiment;

FIG. 1D is a system diagram illustrating a further example RAN and a further example CN that may be used within the communications system illustrated in FIG. 1A according to an embodiment;

DETAILED DESCRIPTION

Figure 1A:
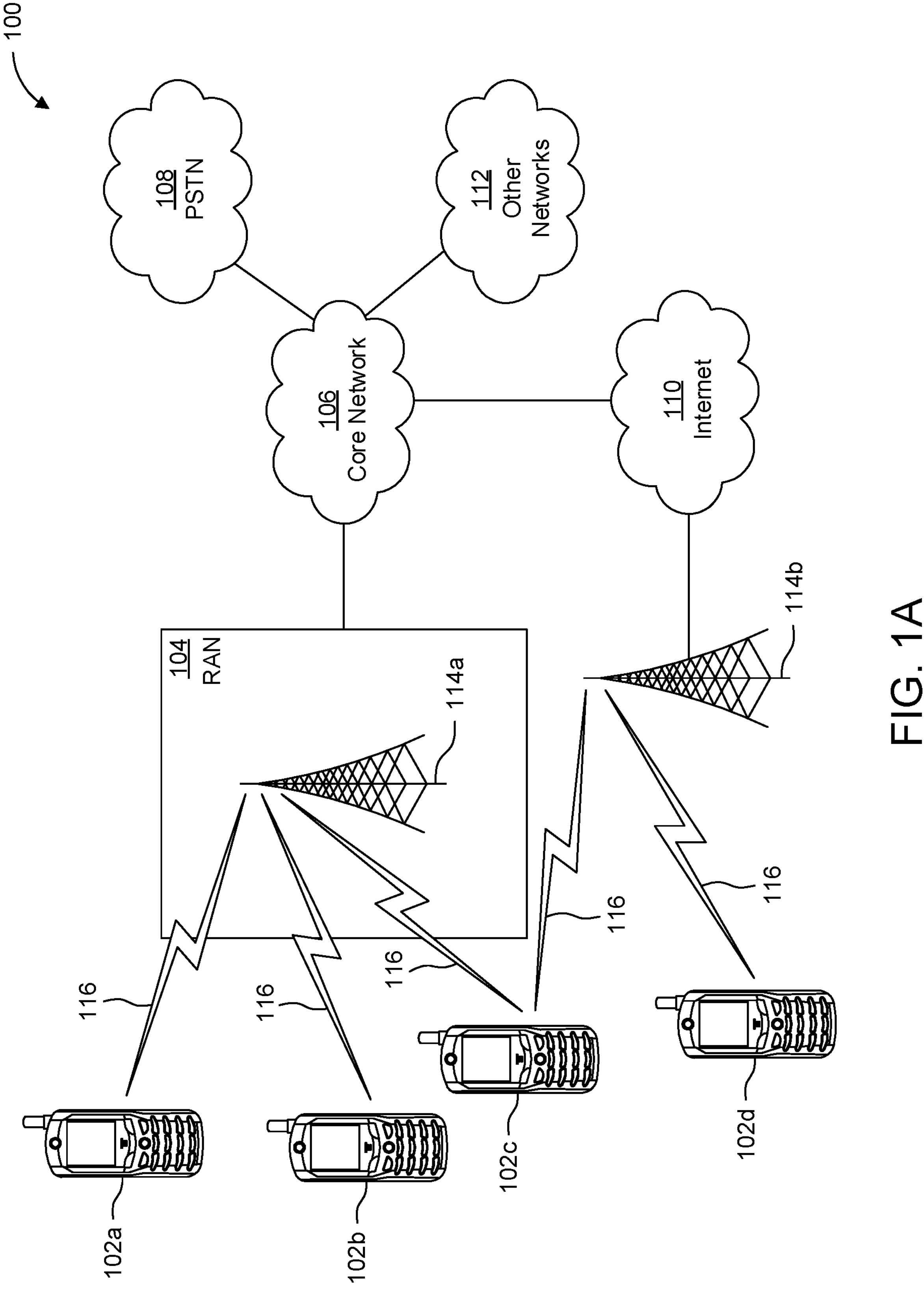
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA-F). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
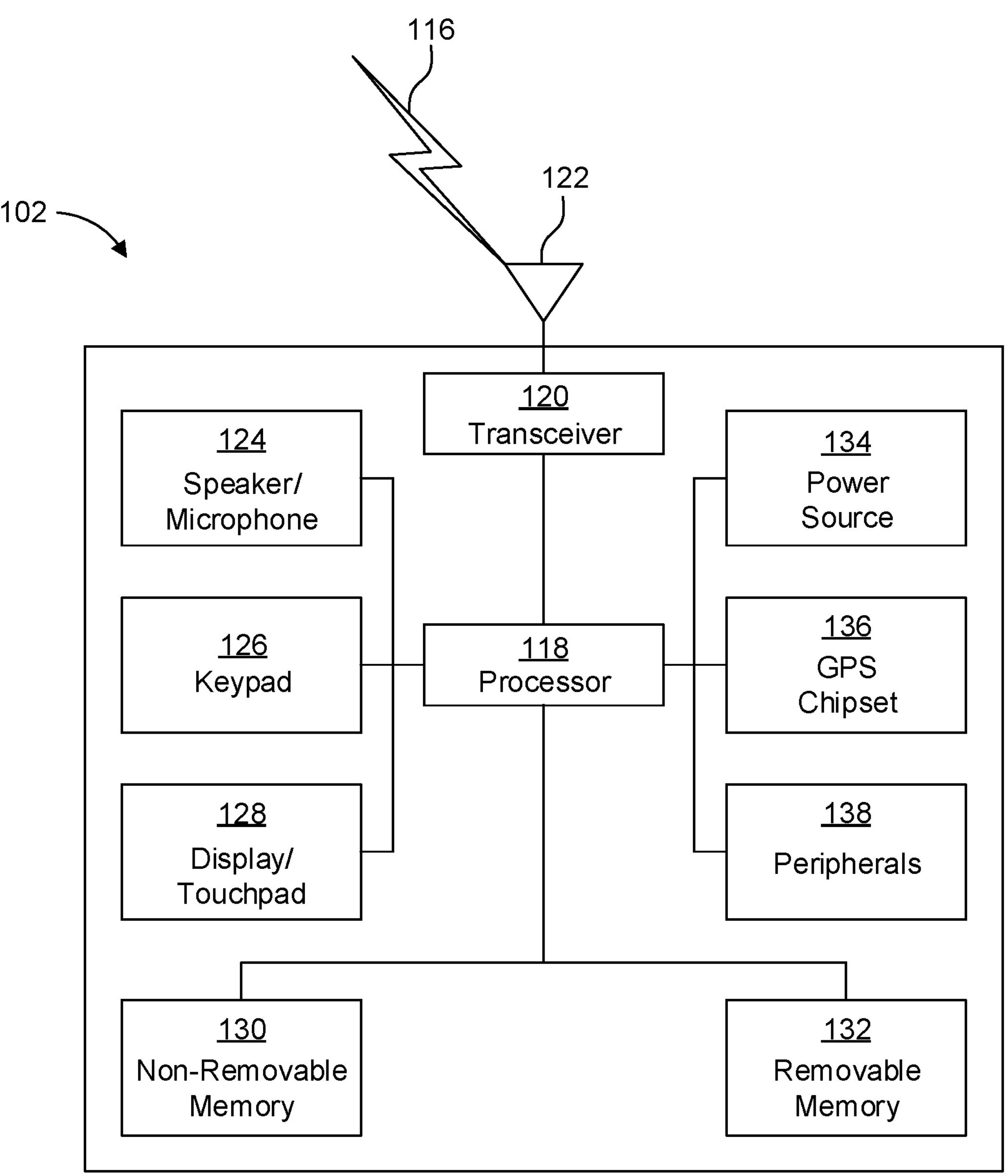
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180_a_, 180_b_, 180_c_ may be configured to communicate with the WTRUs 102_a_, 102_b_, 102_c_ in a standalone configuration and/or a non-standalone configuration. In the standalone configuration, WTRUs 102_a_, 102_b_, 102_c_ may communicate with gNBs 180_a_, 180_b_, 180_c_ without also accessing other RANs (e.g., such as eNode-Bs 160_a_, 160_b_, 160_c_). In the standalone configuration, WTRUs 102_a_, 102_b_, 102_c_ may utilize one or more of gNBs 180_a_, 180_b_, 180_c_ as a mobility anchor point. In the standalone configuration, WTRUs 102_a_, 102_b_, 102_c_ may communicate with gNBs 180_a_, 180_b_, 180_c_ using signals in an unlicensed band. In a non-standalone configuration WTRUs 102_a_, 102_b_, 102_c_ may communicate with/connect to gNBs 180_a_, 180_b_, 180_c_ while also communicating with/connecting to another RAN such as eNode-Bs 160_a_, 160_b_, 160_c_. For example, WTRUs 102_a_, 102_b_, 102_c_ may implement DC principles to communicate with one or more gNBs 180_a_, 180_b_, 180_c_ and one or more eNode-Bs 160_a_, 160_b_, 160_c_ substantially simultaneously. In the non-standalone configuration, eNode-Bs 160_a_, 160_b_, 160_c_ may serve as a mobility anchor for WTRUs 102_a_, 102_b_, 102_c_ and gNBs 180_a_, 180_b_, 180_c_ may provide additional coverage and/or throughput for servicing WTRUs 102_a_, 102_b_, 102_c_.

Each of the gNBs 180_a_, 180_b_, 180_c_ may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184_a_, 184_b_, routing of control plane information towards Access and Mobility Management Function (AMF) 182_a_, 182_b_ and the like. As shown in FIG. 1D, the gNBs 180_a_, 180_b_, 180_c_ may communicate with one another over an Xn interface.

The CN 106 shown in FIG. 1D may include at least one AMF 182_a_, 182_b_, at least one UPF 184_a_, 184_b_, at least one Session Management Function (SMF) 183_a_, 183_b_, and possibly a Data Network (DN) 185_a_, 185_b_. While the foregoing elements are depicted as part of the CN 106, it will be appreciated that any of these elements may be owned and/or operated by an entity other than the CN operator.

The AMF 182_a_, 182_b_ may be connected to one or more of the gNBs 180_a_, 180_b_, 180_c_ in the RAN 104 via an N2 interface and may serve as a control node. For example, the AMF 182_a_, 182_b_ may be responsible for authenticating users of the WTRUs 102_a_, 102_b_, 102_c_, support for network slicing (e.g., handling of different protocol data unit (PDU) sessions with different requirements), selecting a particular SMF 183_a_, 183_b_, management of the registration area, termination of non-access stratum (NAS) signaling, mobility management, and the like. Network slicing may be used by the AMF 182_a_, 182_b_ in order to customize CN support for WTRUs 102_a_, 102_b_, 102_c_ based on the types of services being utilized WTRUs 102_a_, 102_b_, 102_c_. For example, different network slices may be established for different use cases such as services relying on ultra-reliable low latency (URLLC) access, services relying on enhanced massive mobile broadband (eMBB) access, services for MTC access, and the like. The AMF 182_a_, 182_b_ may provide a control plane function for switching between the RAN 104 and other RANs (not shown) that employ other radio technologies, such as LTE, LTE-A, LTE-A Pro, and/or non-3GPP access technologies such as WiFi.

The SMF 183_a_, 183_b_ may be connected to an AMF 182_a_, 182_b_ in the CN 106 via an N11 interface. The SMF 183_a_, 183_b_ may also be connected to a UPF 184_a_, 184_b_ in the CN 106 via an N4 interface. The SMF 183_a_, 183_b_ may select and control the UPF 184_a_, 184_b_ and configure the routing of traffic through the UPF 184_a_, 184_b_. The SMF 183_a_, 183_b_ may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184_a_, 184_b_ may be connected to one or more of the gNBs 180_a_, 180_b_, 180_c_ in the RAN 104 via an N3 interface, which may provide the WTRUs 102_a_, 102_b_, 102_c_ with access to packet-switched networks, such as the Internet 110, to facilitate communications between the WTRUs 102_a_, 102_b_, 102_c_ and IP-enabled devices. The UPF 184, 184_b_ may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102_a_, 102_b_, 102_c_ with access to the other networks 112, which may include other wired and/or wireless networks that are owned and/or operated by other service providers. In one embodiment, the WTRUs 102_a_, 102_b_, 102_c_ may be connected to a local DN 185_a_, 185_b_ through the UPF 184_a_, 184_b_ via the N3 interface to the UPF 184_a_, 184_b_ and an N6 interface between the UPF 184_a_, 184_b_ and the DN 185_a_, 185_b_.

In view of FIGS. 1A-1D, and the corresponding description of FIGS. 1A-1D, one or more, or all, of the functions described herein with regard to one or more of: WTRU 102_a-d_, Base Station 114_a-b_, eNode-B 160_a-c_, MME 162, SGW 164, PGW 166, gNB 180_a-c_, AMF 182_a-b_, UPF 184_a-b_, SMF 183_a-b_, DN 185_a-b_, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

5G systems are largely designed to operate in licensed frequency bands that are dedicated for use by 5G deployments. As such, there is no expectation of coexistence with high powered interferers such as, but not limited to Airborne Early Warning and Control Systems (AWACS) Radar. More generally, 5G technology was not designed for operation in the presence of high-powered pulsed interferers and has related jamming vulnerabilities. Coexistence of 5G with other systems operating in the same band as 5G, requires advanced signal processing techniques to mitigate the interference.

In this disclosure, embodiments for signal processing techniques, for example, referred to as squelching, are described. The embodiments may include identifying radar interference samples, assessing whether these significantly impacts the communication performance, and replacing them with an appropriate value if beneficial to the system. Similar proposed techniques may include pulse blanking, suggested for radar interference mitigation for GPS receivers as well as for combating impulsive interference in OFDM based communication systems. Additionally, embodiments for blanking to remove RF interference within the field of radiometry are described. Blanking may relate to identifying and completely removing or omitting samples contaminated by radio frequency interference. Squelching may assess and alter the values of these samples. Radar pulses may be transmitted using hundreds of kilowatts of transmit power with a very high gain antenna, contributing to the radar being able to cause significant co-channel interference to a communication system. Additionally, as sidelobes can also include relatively high power, the radar main beam may not necessarily need to directly point at the communication terminal or base station (BS). It is noted that the techniques presented in this disclosure are applicable to any other interferer (e.g., narrow band or wide band) and can be used for solving coexistence system issues.

The following terminologies may be used throughout this disclosure.

ADC: Analog to Digital Converter
AoA: Angle of Arrival
BW: Bandwidth
BPF: Bandpass filter
BSF: Bandstop filter
CP: Cyclic Prefix
CSI-IM: Channel Status Information—Interference Management
DCI: Downlink Control Information
DMRS: DeModulation Reference Signal
DSP: Digital Signal Processing
DU: Distributed Unit
ISR: Interference to Signal Ratio
LTI: Linear Time Invariant
MA: Moving Average
NN: Neural Network
OS: Oversample Scale
PDSCH: Physical Downlink Control Channel
PRACH: Physical Random Access Channel
PRF: Pulse Repetition Frequency
PSD: Power Spectral Density
RB: Resource Block
RU: Radio Unit
Rx: Received
Seff: Effective Signal Power, meaning signal power in allocated bandwidth
Ieff: Effective Interferer Power, meaning interferer power in allocated bandwidth
SIB: System Information Block
SINR: Signal to Interference Noise Ratio
SNR: Signal to Noise Ratio
UE: User Equipment Many radar systems operate with high power but short duration pulses. These pulses may typically be much shorter then 5G OFDM symbols. Furthermore, the Pulse Repetition Frequency (PRF) of such radars typically imply that there may be only zero to a few pulses per slot and typically 1 or fewer pulses per symbol, but more are possible. It is not always possible or even desirable to simply avoid the symbols or slots which contain radar pulses.

Even though the radar pulse may be short compared to symbols, they can have much larger power (or energy) in the pulse than in the 5G symbol. Thus, even this short pulse can cause substantial degradation. If only a small number of symbols per slot are affected by radar, then it may be feasible to simply avoid using these symbols, but if many symbols area affected, avoiding symbols becomes impractical or impossible. Thus, methods and apparatuses are needed to operate through the radar interference.

Most incumbents do not advertise or signal properties of the impulsive interference, so detection of the pulse and distribution of pulse information throughout the 5G network may also be needed.

Pulse detection and/or signaling of pulse properties may not be always sufficient to determine if corrupted samples cause enough degradation to indicate some mitigation action need to be used. Methods and apparatuses to determine when a mitigating action is taken are needed.

In order to operate in the presence of high-power pulse interference, the approach of combined radar pulse detection, evaluation, and squelching is suggested. The latter, squelching, may be effectively carried out by replacing the radar corrupted samples in the time-domain with either zero or some other appropriate values. The pulse detection and evaluation may be used to identify which samples of the received signal includes radar interference and if the interference is substantial enough to warrant squelching. This processing can be employed over the entire channel, or separately for subsets of different physical channels in a communication standard such as 5G. For example, separate signal processing streams may be used for PRACH and the rest of the UL physical channels with separate squelching may be used for each UL physical channel. Having separate processing streams may be desirable as different signal structures and waveforms can have distinct criteria for when to apply squelching, and may make detection easier. Squelching within OFDM symbols, for example, may impact the orthogonality between different subcarriers resulting in inter carrier interference which may cause more harm than the actual radar interference. Nevertheless, with careful consideration when to apply squelching, the technique can recover much of the performance lost due to interference.

Embodiments for one-shot pulse detection are described herein. In one embodiment, a pulse detector may not assume any structure like PRF or pulse length, and thus look for interference that can occur at any sample, possibly limited to a given time-window. Measurements may be collected from the same window and used to compute a threshold, which is used to compare incoming samples against. Surpassing this threshold, the detector may mark the sample or set of samples as interference corrupted and suitable for squelching. With knowledge of utilized REs and/or spectral location of the interference, pulse detection prefiltering can be applied before the pulse detection to enhance detection and evaluation performance.

Embodiments for multi-shot pulse detector are described herein. In contrast to the one-shot pulse detector, the multi-shot detector may utilize information collected from multiple time-windows. With the one-shot pulse detector output used as an input, the multi-shot detector can, through spectral analysis such as Fast Fourier transform (FFT), matched filter banks or Neural Networks (NNs), combined pulse detector data and estimate radar parameters such as PRF and pulse length to further enhance performance.

Embodiments for network aided pulse detection are described herein. In this embodiment, radar parameters such as: rotation peak time, rotation peak duration, 1st pulse delay, pulse width, PRF, carrier frequency and/or BW may be provided through the network. Using this information, and compensating for estimated delay spread, interference power and timing advance, squelching may be applied to the received signal. This information may come from one or more external sources such as a radar detector. Alternatively or additionally, this information may come from one or more base stations such as a gNB specifically enhanced for radar detection. Alternatively or additionally, this information may come from data collected from one or more WTRUs, for example, enlisted to report short time scale measurements.

Embodiments for wideband squelching are described herein. In wideband squelching, deemed interference corrupted samples may be squelched by replacing samples with zeros. The wideband squelching may have the advantage of low complexity and low latency, making it a viable method for addressing interference in simpler hardware such as WTRUs. Thus, wideband squelching may provide a substantial performance improvement.

Embodiments for sub-band squelching are described herein. It is noted that wideband squelching may not target the spectrum where the radar exists. In wideband squelching, the whole channel may be squelched, even signals components that are not corrupted. Sub-band squelching may refer to the squelching version where marked interference corrupted samples are replaced by a prefiltered version of the received signal instead of zeros. Obtaining radar pulse parameters either from external radar sensors or derived from the received signal itself, the prefilter may be configured to reject the portion of the frequency band including the radar interference. This filter output may be used instead of zeros. This can be seen as a type of squelching that is limited in both time and frequency.

Embodiments for squelching threshold setting based on allocated/granted RBs and radar BW are described herein. In this embodiment, the receiver may perform a spectral analysis of the interference pulse(s) to estimate the interference frequency domain location or may be provided such information from one or more external entities. For example, the carrier and BW of radar and other spectrum information may be estimated and compared to RBs that need to be received and decoded. The amount of frequency domain 'overlap' between the desired signal and interference can be used to adjust the threshold for squelching. For example, if the radar is well separated from the desired RBs, then a higher threshold for squelching may be used since the interference affecting reception is lower. Alternatively or additionally, the radar spectral information may be provided from and external source such as a database or by an external radar sensor(s). The external sensor may have a network connection with the distributed unit (DU) of the BS (e.g., gNB) and receive messages that indicate properties of the radar. It is noted that the external sensor may not have a network connection. Specifically, the WTRU may be connected to other WTRUs (e.g., either directly or through the BS) and the WTRU may receive the information even if it does not have sensors. The radar spectrum usage, for example, center frequency and bandwidth, or PSD, may be included in the messages. The DU may forward this information, possibly processed, to the radio unit (RU). The DU may also send this information to the centralized unit (CU) for further distribution through the network. The radar spectrum information may be incorporated in the method that determine which samples of the Rx data stream to squelch through adjustment of the squelching level. At the RU, additional factors may also be taken into consideration. For example, a radar pulse may corrupt a large fraction of RBs granted to WTRU1, a small fraction of RBs granted to WTRU2, and no RBs granted to WTRU3. Particularly, if wideband squelching is used, the BS (e.g., gNB) may consider how squelching will impact all the WTRUs which may include various QoS requirements for each of the WTRUs. It is noted that the threshold setting at the WTRU may be less complicated since it does not need to be concerned about other WTRUs. However, the WTRU may still have multiple simultaneous services with different importance or QoS and may adjust the threshold to balance these.

Figures 2A, 2B:
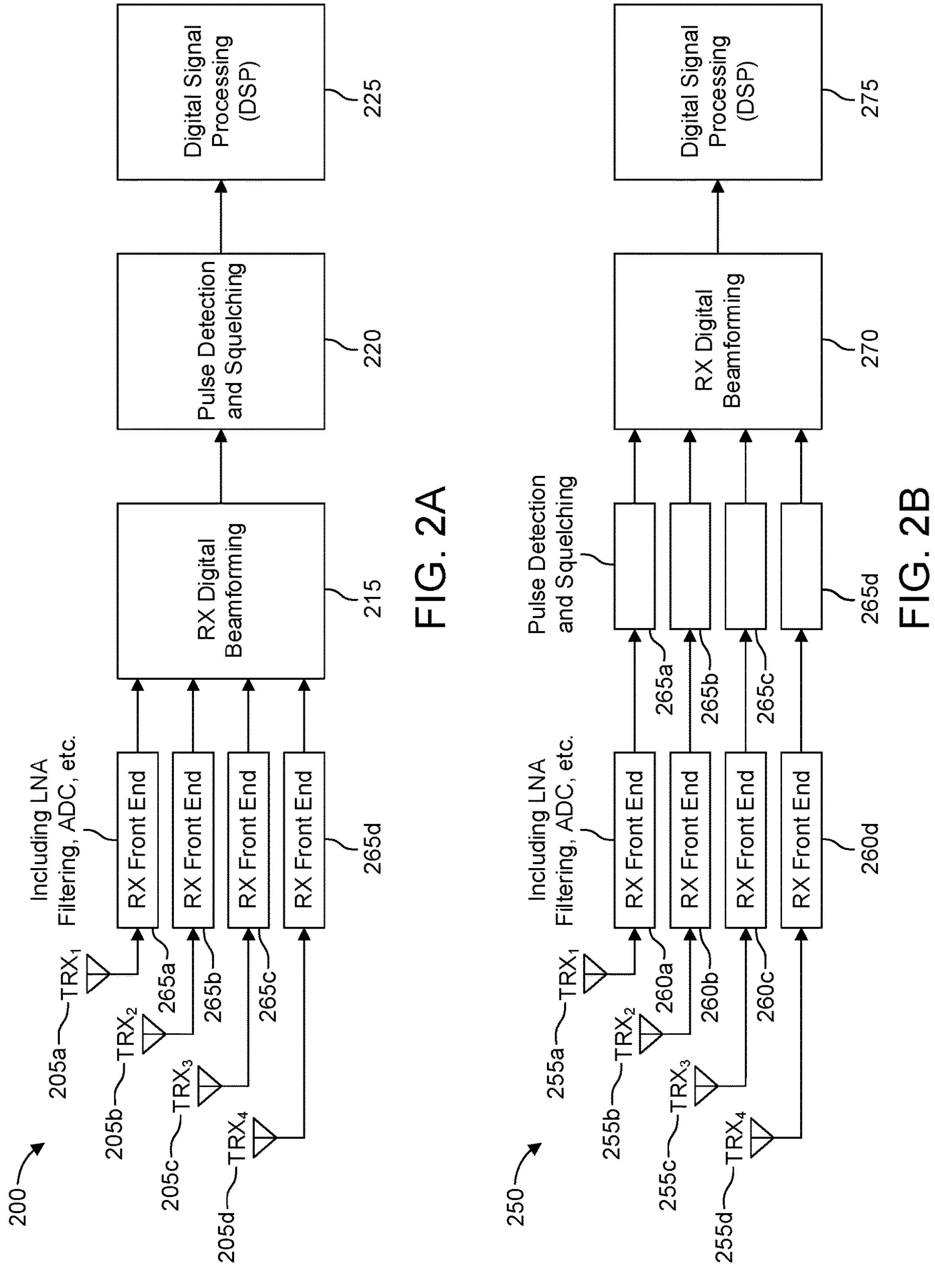
FIG. 2A is a diagram illustrating an example location for the Pulse Detection and Squelching block after digital beamforming in a multiple antenna transceiver.
FIG. 2B is a diagram illustrating another example location for the Pulse Detection and Squelching block before digital beamforming in a multiple antenna transceiver.
Figure 3:
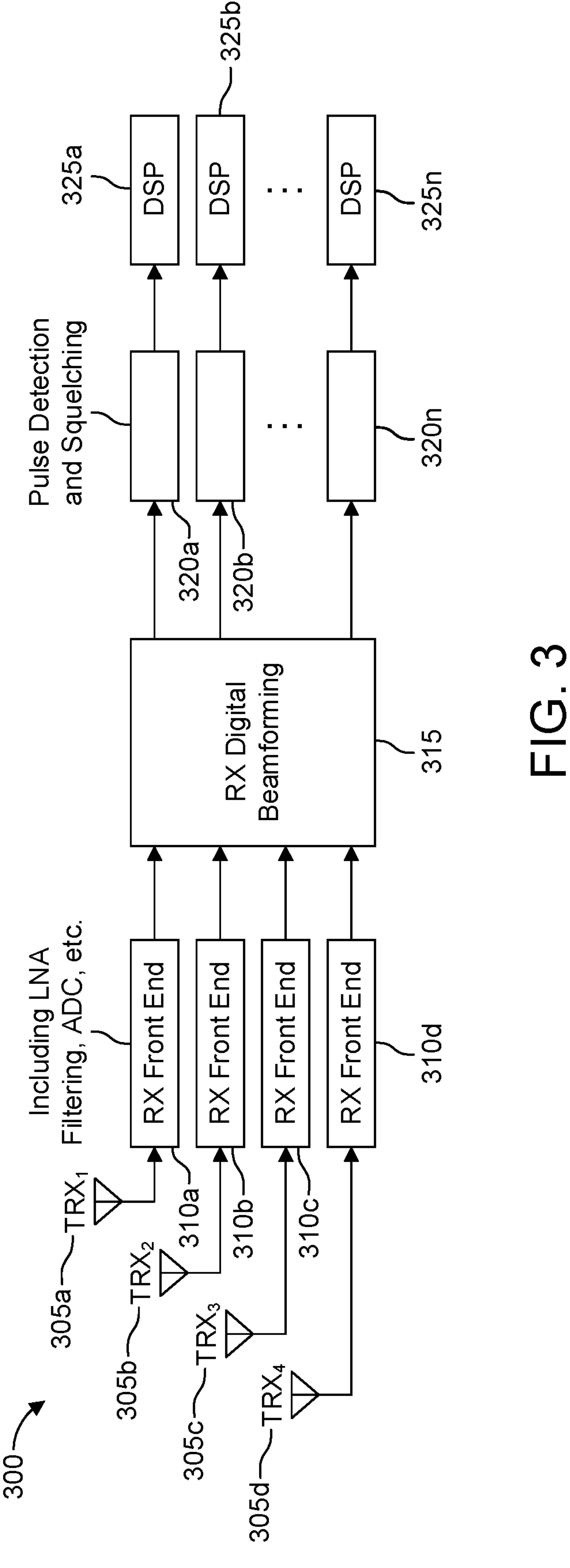
FIG. 3 is a diagram illustrating an example transceiver employing Pulse Detection and Squelching at each output of the receiver (RX) beamforming for multi-layer transmission.

FIG. 2A is a diagram illustrating an example location 200 for the pulse detection and squelching block 220 after digital beamforming in a multiple antenna transceiver, which may be used in combination with any of other embodiments described herein. As illustrated in FIG. 2A, signal processing for the pulse detection and squelching may include, but is not limited to, multiple transceivers 205*a-d*, multiple RX front ends 210*a-d*, a RX digital beamforming block 215, a pulse detection and squelching block 220, and a digital signal processing (DSP) block 225. FIG. 2B is a diagram illustrating another example location 250 for the pulse detection and squelching block 250 before digital beamforming in a multiple antenna transceiver, which may be used in combination with any of other embodiments described herein. As illustrated in FIG. 2B, signal processing for the pulse detection and squelching may include, but is not limited to, multiple transceivers 255*a-d*, multiple RX front ends 260*a-d*, a multiple pulse detection and squelching blocks 265*a-d*, a RX digital beamforming block 270, and a digital signal processing (DSP) block 275. FIG. 3 is a diagram illustrating an example transceiver employing pulse detection and squelching 300 at each output of the receiver (RX) beamforming for multi-layer transmission, which may be used in combination with any of other embodiments described herein. As illustrated in FIG. 3, signal processing for the pulse detection and squelching may include, but is not limited to, multiple transceivers 305*a-d*, multiple RX front ends 310*a-d*, a RX digital beamforming block 315, multiple pulse detection and squelching blocks 320*a-d*, and multiple digital signal processing (DSP) blocks 325*a-d*.

As illustrated in FIGS. 2A, 2B, and 3, the combined pulse detection and squelching can be implemented in single as well as multiple antenna receivers or transceivers. As illustrated in FIGS. 2A and 2B, the pulse detection and squelching block 220, 265*a-d* may be placed after the RX front ends 210*a-d*, 260*a-d*, but before digital baseband signal processing (DSP) blocks 225, 275. Furthermore, the pulse detection and squelching block(s) 220, 265*a-d* can either be applied on a combined receiver processing path/chain (e.g., as illustrated in FIG. 2A) or separately on individual receiver processing paths/chain (e.g., as illustrated in FIG. 2B). In the case shown in FIG. 2B, the pulse detection circuitry may not necessarily exist in all the pulse detection and squelching blocks 265*a-d*, for example, when a pulse is detected in TRX1 255*a*, the squelching can be applied in all TRX paths of TRXs 255*a-d*. Alternatively or additionally, pulse detection circuitry that exists in multiple of the pulse detection and squelching blocks 265*a-d* may first be sent to a detection combiner that combines the detection signals, for example, OR's them together, and thereby applies the same squelching to each TRX 255*a-d*. This combined squelching signal may be applied either before or after the beamforming (e.g., RX Digital Beamforming blocks 220, 270).

As illustrated in FIG. 2A, the system may also employ multi-layer transmission such as, but not limited to, multi-user MIMO. In such a setup, (as illustrated in FIG. 3), the RX digital beamforming output may include multiple signal paths (i.e., paths to pulse detection and squelching blocks 320*a-d*). Thus, depending on application and need, pulse detection and squelching 320*a-d* can be applied to each such signal paths individually or the same squelching can be used for all paths. For the common squelching, the pulse detection circuitry may not necessarily exist in all pulse detection and squelching blocks 320*a-d* in FIG. 3. Additionally or alternatively, and as previously described for the setup in FIG. 2B, the common squelching may also use a combiner that can merge the detection information from the different paths in order to make a more informed decision.

Figures 4A, 4B:
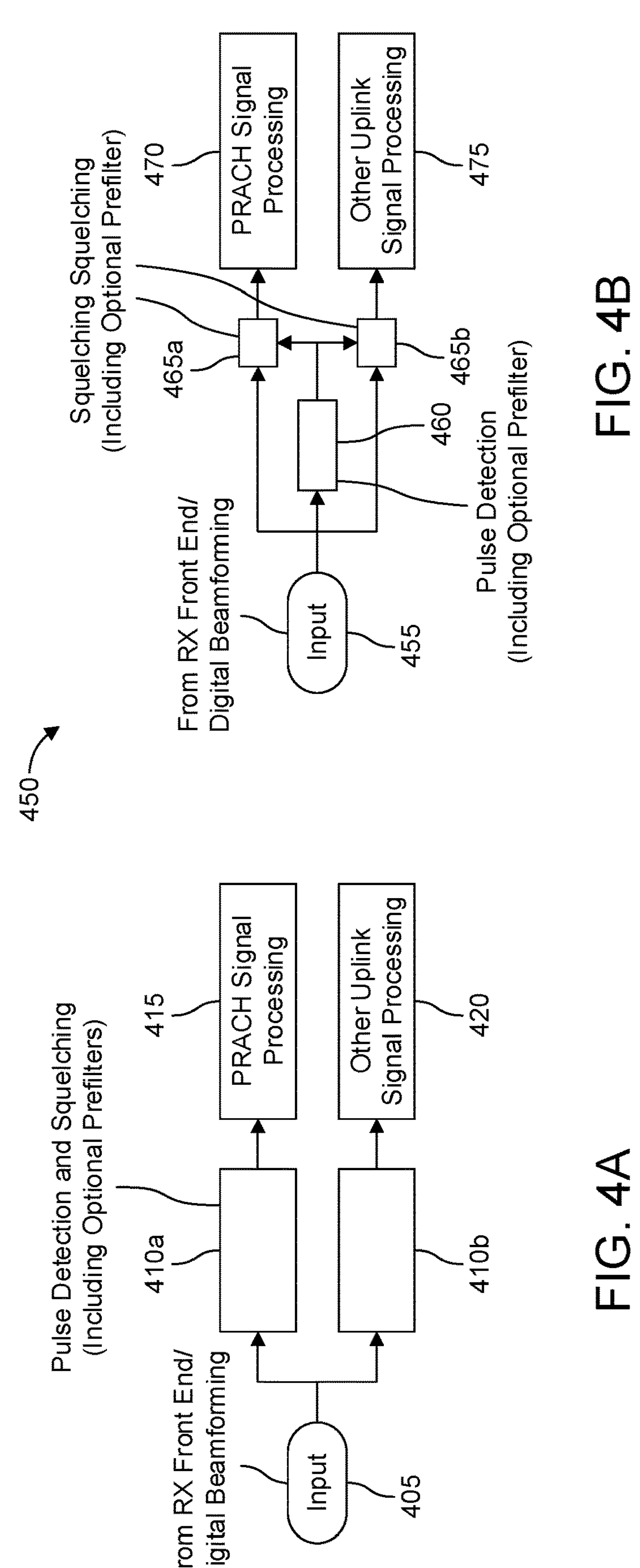
FIG. 4A is a diagram illustrating example channel specific squelching (with specific pulse detection and squelching for each channel), where the channel includes, but is not limited to, a physical random access channel (PRACH) and other uplink/downlink channels.
FIG. 4B is a diagram illustrating example channel specific squelching (with common pulse detection, but separate squelching), wherein the channel includes, but is not limited to, a physical random access channel (PRACH) and other uplink/downlink channels.

FIG. 4A is a diagram illustrating example channel specific squelching 400 (e.g., with specific pulse detection and squelching for each channel), which may be used in combination with any of other embodiments described herein. In this embodiment, the channel may include, but is not limited to, a physical random access channel (PRACH) and other uplink/downlink channels. As illustrated in FIG. 4A, input signals or signal samples 405 from RX front end(s) and/or digital beamforming may be sent to multiple (e.g., two) pulse detection and squelching blocks 410*a-b*. Additionally, or alternatively, each of the pulse detection and squelching blocks 410*a-b* may include one or more filters/prefilters. The signal samples generated from the pulse detection and squelching blocks 410*a-b* may be further processed based on the channels, for example, by a PRACH signal processing block 415 and/or other uplink/downlink signal processing block 420.

FIG. 4B is a diagram illustrating example channel specific squelching 450 (e.g., with common pulse detection, but separate squelching), which may be used in combination with any of other embodiments described herein. As illustrated in FIG. 4A, input signals or signal samples 455 from RX front end(s) and/or digital beamforming may be sent to a common pulse detection block 460 and squelching blocks 465*a-b*. The squelching blocks 465*a-b* may process the input signal samples 455 and the pulse detection output from the common pulse detection block 460 to generate output signal samples. Additionally or alternatively, the squelching blocks 465*a-b* may include one or more filters/prefilters. The output signal samples from the squelching blocks 465*a-b* may be further processed based on the channels, for example, by a PRACH signal processing block 470 and/or other uplink/downlink signal processing block 475.

In this embodiment, the channel may include, but is not limited to, a physical random access channel (PRACH) and other uplink/downlink channels. With communication standards such as 5G having different physical channels, channel specific pulse detection and squelching 400, 450 may be applied to each channel separately. For example if a distinct signal path is used for PRACH in the uplink, the pulse detection and squelching 410*a-b* can be applied to each of these paths as illustrated in FIG. 4A. Additionally or alternatively, pulse detection 460 can be performed on a common signal stream while squelching 465*a-b* may be applied separately for each of the other channel with a different threshold as illustrated in FIG. 4B. It is noted that the squelching criteria/threshold may still be distinct for each signal path in the latter approach as illustrated in FIG. 4B.

Figure 5:
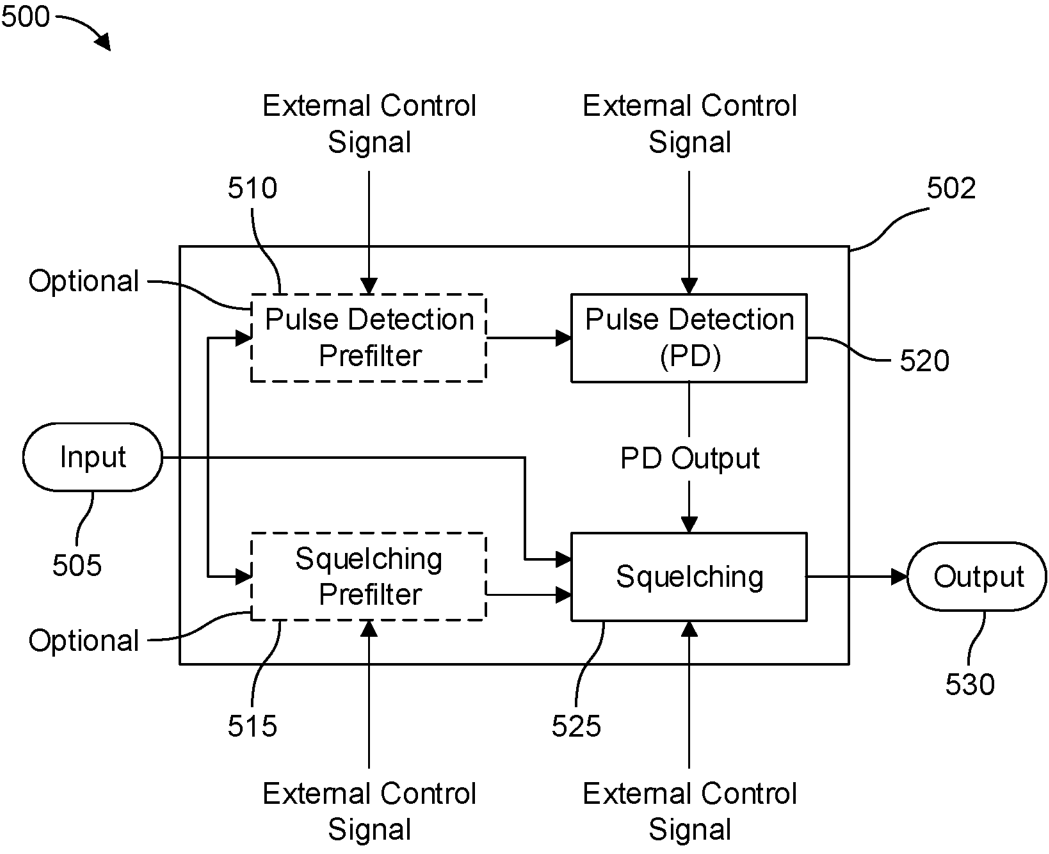
FIG. 5 is a diagram illustrating an example pulse detection and squelching.

FIG. 5 is a diagram illustrating an example pulse detection and squelching 500, which may be used in combination with any of other embodiments described herein. FIG. 5 is a more detailed block diagram of the pulse detection and squelching 500, where the pulse detection and squelching block 502 may correspond to the pulse detection and squelching blocks 220, 265*a-d*, 320*a-n*, 410*a-b*, 460, 465*a-b* illustrated in FIGS. 2A, 2B, 3, 4A and 4B. The source of the input 505 and output 530 of the pulse detection and squelching block 502 can be traced back using FIGS. 2A, 2B, 3, 4A, and 4B. As illustrated in FIG. 5, the input signal samples 505 may be processed by the pulse detection prefilter 510 and/or the squelching prefilter 515 before the PD block 520 and the squelching block 525. Alternatively, or additionally, the input signal samples 505 may be processed by the PD block 520 and/or the squelching block 525 without the pulse detection prefilter 510 and the squelching prefilter 515. The squelching block may generate output signal samples 530 based on the PD output from the PD block 520, the input signal samples 505, and/or signal samples generated by the squelching prefilter 515. The output signal samples may include one or more signal samples (e.g., 5G signal samples) and one or more interfered signal samples squelched (i.e., set) to zero or another value.

It is noted that all included blocks 510, 515, 520, 525 can be configured either at startup or adaptively during operation through external control signals. The external control signals may be received at the WTRU from a BS via broadcast transmission (e.g. system information or PBCH), unicast transmission (e.g. DCI in PDCCH) or other configuration information (e.g. channel state information configuration information such as CSI-IM configuration). The external control signals may be received at the BS or BS components (CU, DU, RU) via interfaces between BS and radar detector, or Xn interface (interface between BS and other BS), or via N2 or N3 interface. The external control signals may include, but are not limited to, include a reference pulse time/delay, a pulse width, a pulse repetition frequency (PRF), a rotation envelop peak time/delay, rotation envelop peak duration, and a rotation period, an interference center frequency and an interference bandwidth (BW). Furthermore, optional prefiltering/filtering (e.g., pulse detection prefilter 510 and/or squelching prefilter 515) may be available before both pulse detection (PD) block 520 and/or squelching block 525. The purpose of these prefilters/filters 510, 515 may include, but are not limited to, channel separation for different physical channels, bandpass filtering to ease pulse detection and band reject filter to remove radar and enable sub-band squelching. Any combination of these prefilters/filters 510, 515 may be used either in parallel or in series. For example, it is possible to first have a filter to separate a particular physical channel as may be desirable for PRACH as illustrated in FIG. 4A. This filter can then be followed by a BPF for easier pulse detection. In the second signal stream, there may also be a channel separation filter, followed by a different, or no BPF. In FIG. 5, it is also shown that an additional copy of the unfiltered receive signal may be available for the squelching block 525 as applications such as sub-band squelching may need both a filtered and unfiltered reference signal.

Embodiments for pulse detection are described herein. The main task of the pulse detection is to identify in which samples the radar interference is large enough such that it is better to squelch a sample of the received signal rather than let the degraded sample proceed to further processing. This level may occur substantially above the level at which the pulse can be reliably detected at all. Throughout this disclosure, the term pulse detection (PD) may refer to detecting or identifying interference signal samples, for example, by method(s) of identifying signal samples with power above a squelching threshold. Identification can be performed using power or energy detection, match filtering or any other appropriate technique for signal detection. Alternatively or additionally, for radar pulse detection, any knowledge of pulse width (duration), pulse repetition frequency, center frequency and/or bandwidth can be utilized to further improve detection performance.

Figure 6:
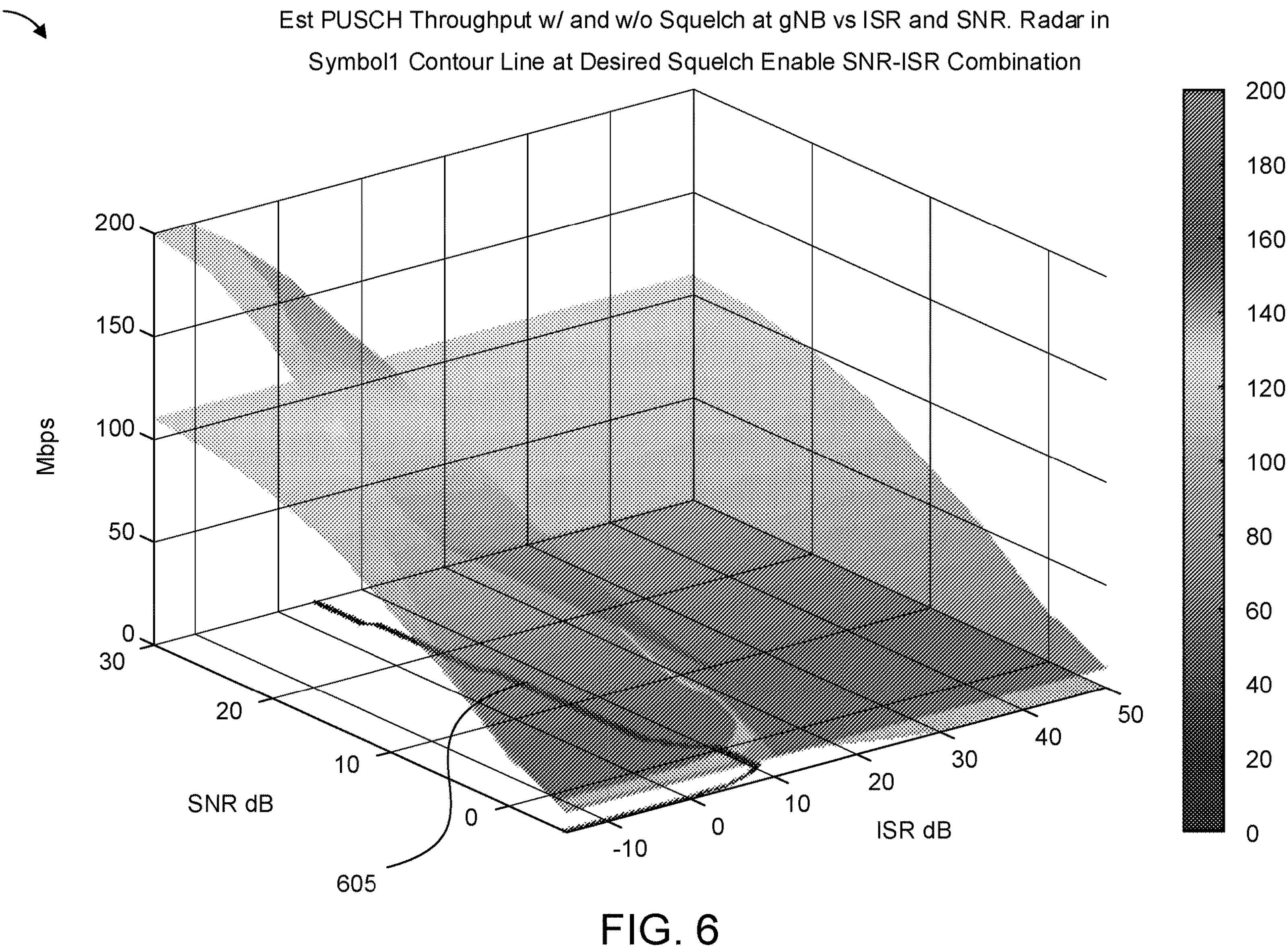
FIG. 6 is a diagram illustrating an example surface showing obtained throughput (TP) vs Signal to Noise Ratio (SNR) vs Interference to Signal Ratio (ISR) with and without squelching.

FIG. 6 is a diagram illustrating an example surface showing obtained throughput (TP) vs Signal to Noise Ratio (SNR) vs Interference to Signal Ratio (ISR) with and without squelching 600, which may be used in combination with any of other embodiments described herein. The curve 605 in FIG. 6 is the ISR-SNR boundary where squelching is beneficial. The ISR may indicate how high the interference signal is compared to a 5G signal. The SNR may indicate how the noise signal is compared to the 5G signal. FIG. 6 shows that for high SNR, squelching is beneficial at about 4 dB ISR and for low SNR, and squelching is not beneficial until about 8-10 dB ISR.

The decision of when to squelch may depend on the SNR and SIR, or equivalently, the desired ISR at which to squelch depends on the SNR (e.g., in this context, the noise may include thermal plus interference from other cells and any approximately stationary non-5G interference which excludes the bursty interference). The desired SIR at which to squelch can be approximated by simulation as illustrated in FIG. 6. The decision to squelch or not can be implemented by adjusting the threshold (i.e., the curve 605) used to compare the signal metric. The noise estimate can either be measured directly from the signal or estimated indirectly from target SINR set by the higher layers or by the MCS's being used. An example method of setting the threshold accounting for the overlap scaling and for a target SIR based on an estimated SNR is illustrated in FIG. 7.

Figure 7:
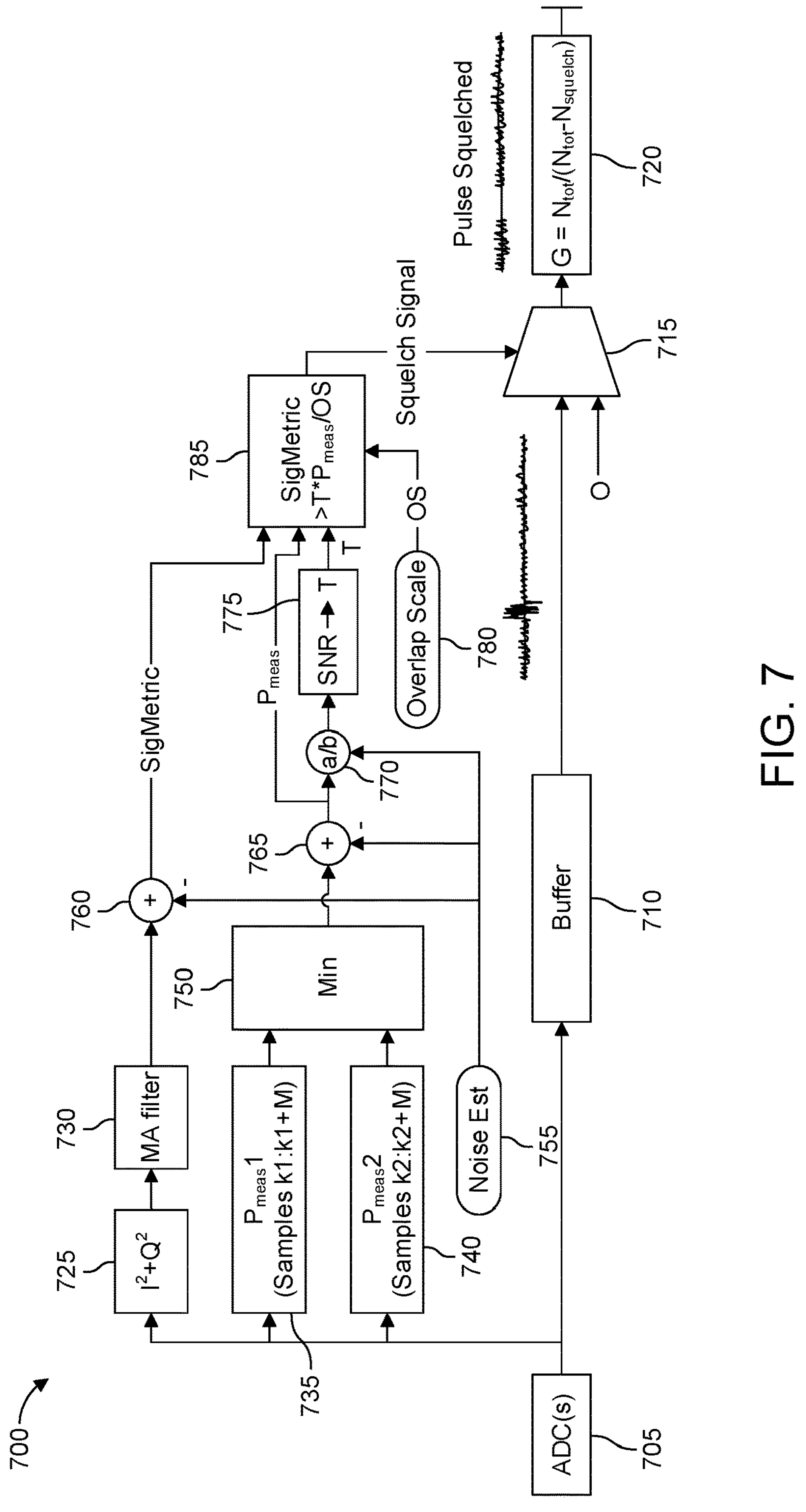
FIG. 7 is a diagram illustrating an example sample-wise squelching with adaptive threshold factor, T, based on SNR.

FIG. 7 is a diagram illustrating an example sample-wise squelching with adaptive threshold factor, $T^*P_{meas}/OS$, based on SNR 700, measured power $P_{meas}$, and Overlap Scale (OS), which may be used in combination with of other embodiments described herein. As illustrated in FIG. 7, ADC 705 may send signal samples to the $I^2+Q^2$ block 725 to measure power metrics/values of the received signals. The moving average (MA) filter 730 may average the string of power metrics/values received from the $I^2+Q^2$ block 725 to calculate an average power throughout multiple samples. The average power is combined with the noise estimation 755 at 760 to generate SigMetric. Two power measurements taken from different samples at different times are calculated by $P_{meas}1$ block 735 and $P_{meas}2$ block 740 to find the peak. The Min block 750 may determine the lower or minimum value of the two power measurements from among the $P_{meas}1$ block 735 and the $P_{meas}2$ block 740. The result of Min block 750 and the noise estimation 755 may be combined at 765, and SNR may be determined at 770. The SNR determined at 770 may be mapped to a threshold at 775 based on a preconfigured mapping information or a preconfigured mapping table. The SigMetric received from 760 and the threshold received from 775 may be compared at 785 with the overlapping scale factor 780. If the SigMetric is above the threshold, squelching may be needed because the interference exists. If the SigMetric is below the threshold, squelching may not be needed because the inference does not exist. The buffer 710 may hold all the signal samples and provide the sample signals to the Multiplexer 715. When the Multiplexer 715 receives the squelch signal generated by 785, the Multiplexer 715 may remove the squelched part from the signal samples, thereby generating a pulse squelched at 720.

As illustrated in FIG. 7, the threshold determined at 775 may be set such that the probability of squelching a sample with ISR=targetISR is 50%, for example, if the sample has an ISR=targetISR for the currently estimated SNR. In this way, the decision to squelch is greater than 50% (ideally 100%) when the ISR is larger than the target ISR; and less than 50% (ideally 0%) when the ISR is smaller than the target ISR. The effectiveness of the SNR adaptive thresholding is shown in FIGS. 8A and 8B.

Figures 8A, 8B:
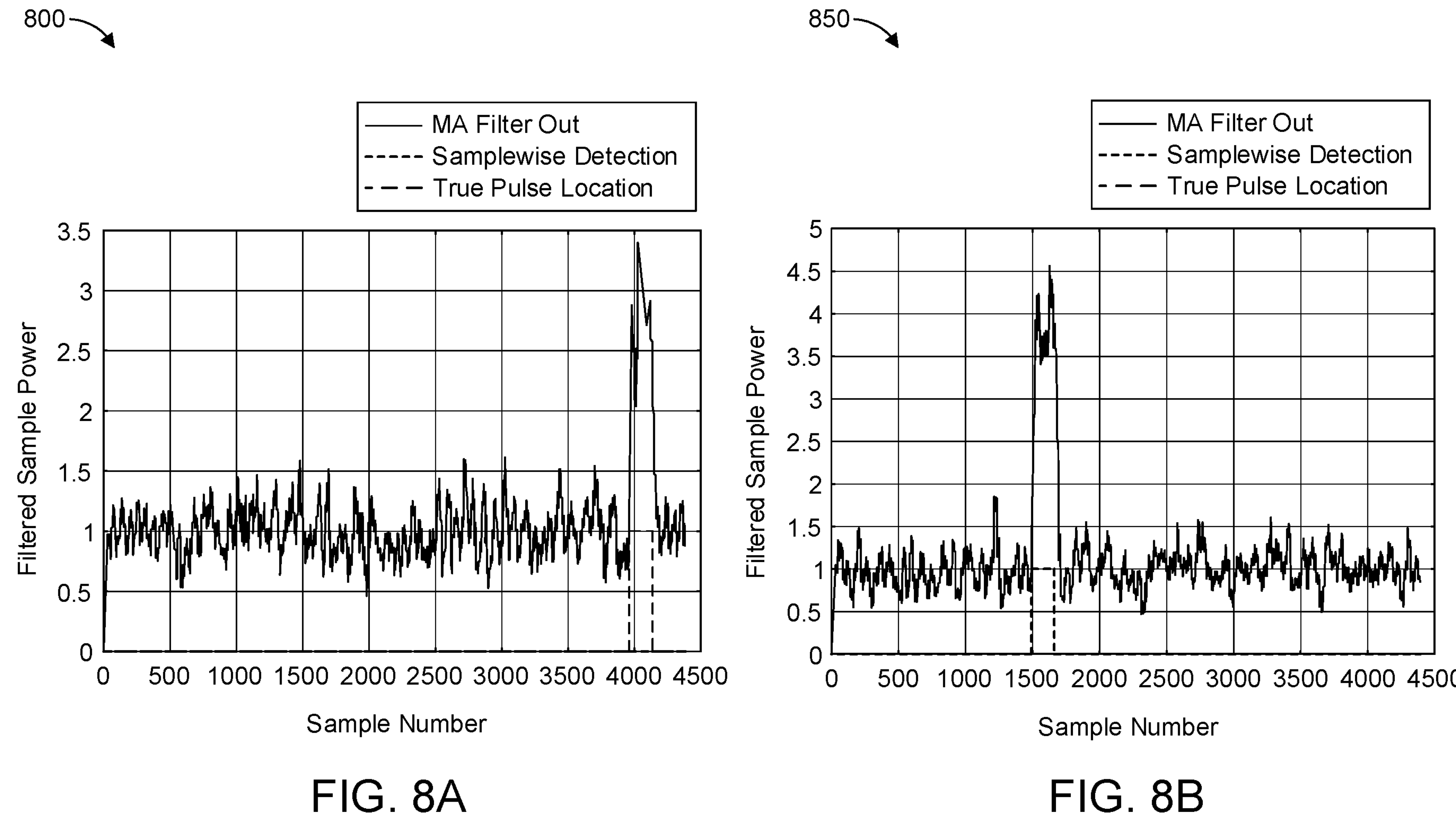
FIG. 8A is a diagram illustrating an example squelching for an ISR 1 dB below the ISR target for the given SNR 800.
FIG. 8B is a diagram illustrating an example squelching for an ISR 1 dB above the ISR target for the given SNR.

FIG. 8A is a diagram illustrating an example squelching for an ISR 1 dB below the ISR target for the given SNR 800, which may be used in combination with any of other embodiments described herein. FIG. 8B is a diagram illustrating an example squelching for an ISR 1 dB above the ISR target for the given SNR 850, which may be used in combination with any of other embodiments described herein. In FIG. 8A, the example sample-wise detection and/or squelching 800 may be set for target Prob. Det=50% at Target ISR=4 dB, Threshold Factor=3.59, SNR=30 dB, Act. ISR=3 dB, Prob. FA=0.000119%, MA Ien=32 samples, MeasDur=1 μs, and Pd for Act. ISR=19%. In FIG. 8B, the example sample-wise detection and/or squelching 850 may be set for target Prob. Det=50% at Target ISR=4 dB, Threshold Factor=3.59, SNR=30 dB, Act. ISR=5 dB, Prob. FA=0.00465%, MA Ien=32 samples, MeasDur=1 μs, and Pd for Act. ISR=82%. As illustrated in FIG. 8A, for an ISR 1 dB below the target, squelching probability has already dropped to 19%. As illustrated in FIG. 8B, for an ISR 1 dB above the target, squelching probability has already increased to 82%. In this case, the thresholding may occur with an ISR slightly above and below the targeted ISR. For an ISR 1 dB above the target, squelching probability may have already increased to 82%.

Embodiments for one-shot pulse detection are described herein. In one embodiment, a pulse detector may look for a pulse that can occur anywhere within a given time-window (i.e., it does not assume a structure like a PRF and is thus referred to as a 'one-shot' detector). This has the advantage of simplicity and can adapt to randomized pulse positions and rapidly changing PRFs at the expense of performance when there is a steady PRF. The time-window can be configured to reflect a frame, subframe, slot, symbol or any other fitting time interval. Decisions to flag a sample as interference corrupted may be made based on measurements made in the specific time-window. Furthermore, this type of pulse detector may not necessarily hold, or rely on knowledge of the pulse carrier frequency or BW and may therefore not require prefiltering of the signal. Nevertheless, if information such as allocated or granted RBs is known to the receiver, this can be utilized to implement an optional prefilter and/or to adjust the threshold used to determine if a sample is to be squelched. Such a filter can be fit to the BW of the desired signals and provide increased sensor sensitivity to radar in the used RBs. Such a filter can also be match to the user allocated portion of spectrum, thereby limiting the interference measurements to be made in the same spectrum where interference would cause harm.

Figure 9:
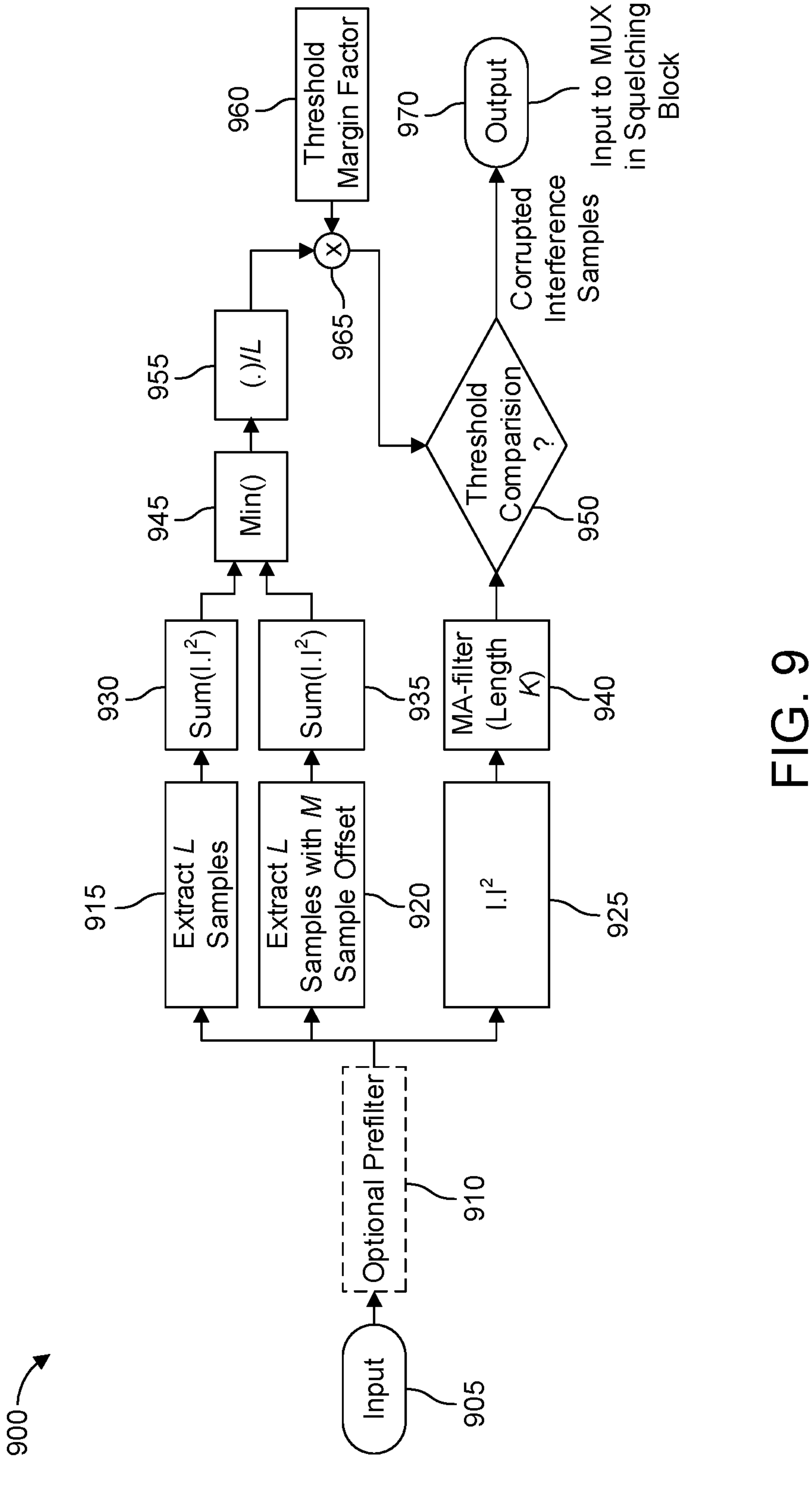
FIG. 9 is a diagram illustrating an example double power estimate pulse detector.

FIG. 9 is a diagram illustrating an example double power estimate pulse detector, which may be used in combination with any of other embodiments described herein. As illustrated in FIG. 9, L number of samples, at an instance t and at instance t+M may be extracted at 915 and 920 from signal samples received from input 905 and an optional prefilter 910. Power measurements for the two set of L samples, at time t and t+M samples, may be calculated at 930 and 935. The Min( ) function 945 may determine the minimum power measurement from the two power measurements. The minimum power measurement from 945 may be divided by L at 955 and calculated at 965 with the threshold margin factor 960 to determine a threshold. This threshold may be compared with an average power at 950. The average power may be calculated by the power measurement $I*I^2$ 925 and MA filter 940 with length K. If the average power is above the threshold, squelching may be needed and the output 970 may be determined as true. If the average power is below the threshold, squelching may not be needed and the output 970 may be determined as false. The output 970 may an input to a multiplexer for squelching.

The double power estimate pulse detector illustrated in FIG. 9 is a specific embodiment of the one-shot pulse detection. After the analog digital converter (ADC) and optional prefiltering, two statistics, for example, power, energy, or mean amplitude may be computed from a subset of samples taken from a given time-window. The sets may be separated by a gap spanning M samples which exceed the expected radar pulse (including any channel delay spread). This effectively guarantees that at least one of the measurements will not contain radar interference as shown in FIG. 10.

Figure 10:
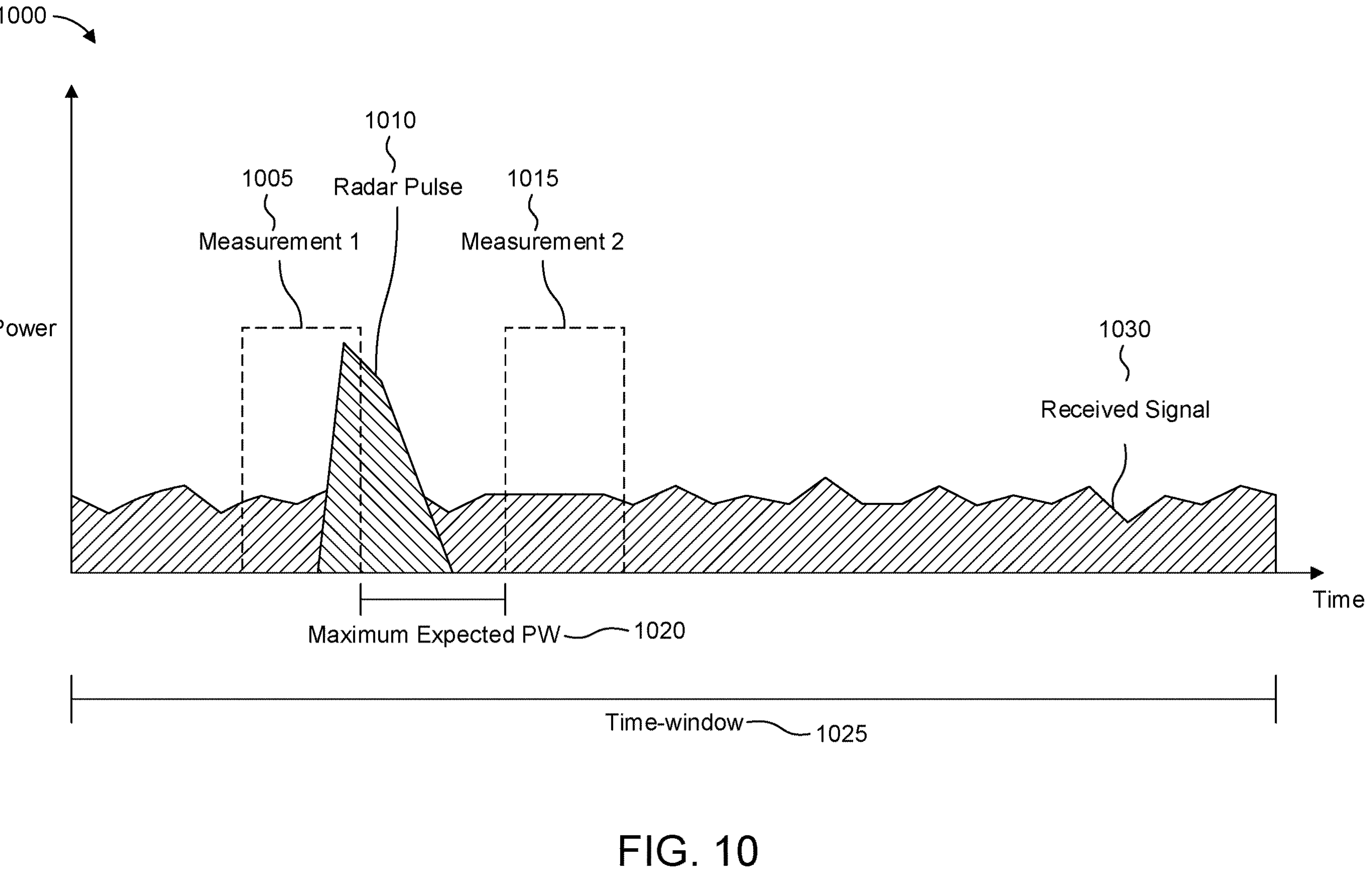
FIG. 10 is a diagram illustrating an example power measurements/estimate acquisition in the double power estimate pulse detector.

FIG. 10 is a diagram illustrating an example power measurements/estimate acquisition in the double power estimate pulse detector 1000, which may be used in combination with any of other embodiments described herein. As illustrated in FIG. 10, two power measurements, measurement 1 1005 and measurement 2 1015, for the received signal 1030 may be taken during the time window 1025. The measurement 1 1005 and measurement 2 1015 may be apart from each other with the maximum expected pulse width (PW) 1020. The radar interference pulse 1010 may occur during the period of the measurement 1 1005.

An example measurement may comprise summing the squares of the real and imaginary parts of the samples over L samples, where L may be selected to tradeoff performance and complexity. By combining these two measurements, for example, taking the smaller of them, the used measurement may have no radar energy in it, providing a fitting measurement of the signal plus noise power. To reduce complexity and possibly limit added latency, the two measurements can be acquired from samples near the beginning of the time-window, avoiding CP for OFDM as these may cause discrepancies within the power measurement (i.e., in 5G NR, the signal power may change on a symbol basis in normal operation which should not trigger any squelching). By choosing samples just after the CP, it is ensured that there is negligible influence from the previous symbol while minimizing the latency introduced. The selected measurement can then be modified by an optional threshold margin factor as seen by the multiplication in FIG. 9. The threshold margin factor may be used to scale the measured statistic to set the level at which samples are to be squelched. This factor may be used to optimize the squelching decisions and may be a function of several parameters that affect the optimum squelching level. These parameters may include, but are not limited to, SNR, MCS, and fraction of RB spectrum allocation overlapping with the interference. In the case where the receiver is a BS (e.g., gNB), interference may affect different WTRUs differently making the optimal squelching level different for each. In that case, the BS (e.g., gNB) may also consider the overall cell performance, fairness, and WTRU QoS requirements when deciding the squelching level. With the final pulse detection threshold obtained, it can then be used to compare the signal statistic against. The compared signal may be the original or a prefiltered version of the digital received signal. The Moving Average (MA) filter may be used, but various other filters, including non-linear filters or processes that, for example, use higher order moments to better differentiate between high and low PAPR signal (like those of 5G and radar) may also be used. In its most simplistic form, the threshold comparison can be made on a per sample basis, marking a sample as interference corrupted if its statistic exceeds the threshold. As an enhancement, this decision can also be influenced by considering that the radar pulse will span multiple consecutive samples followed by multiple consecutive samples without a radar pulse. For example, the pulse duration can be estimated by measuring the time between the first positive threshold level crossing instant to the time of the last negative threshold crossing time without a widow around an expected pulse duration where the positive threshold need not be the same value as the negative crossing threshold. This adjustment can improve the detection performance. Finally, in one embodiment, the identified corrupted samples and their index within the time-window, may be set to zero. In another embodiment, the samples may be replaced with the output of a filtered version of the input signal where the filter is a band reject filter used to remove the portion of the spectrum associated with the radar's spectrum, for example, the filter reject band is the same as the radar band.

Embodiments for network aided pulse detection are described herein. As some WTRUs may be less capable to determine radar interference parameters, the BS (e.g., gNB) or other network participators such as a radar detector may provide such WTRUs with one or more interference descriptors via signaling (e.g., broadcasting, multicasting, and/or unicasting). The one or more interference descriptors may include, but are not limited to: rotation peak time, rotation peak duration, 1st pulse delay (or a reference pulse time/reference pulse delay), pulse width, PRF, carrier frequency and BW. This can be provided for each interferer source or for each interference pattern (noting that a single source may present multiple patterns). The WTRU may then use this information to appropriately squelch its receiver sample stream. This means that it may need to take into consideration timing advance between itself and the BS (e.g., gNB), delay spread due to the channel, and differences in interference power. Alternatively or additionally, the WTRU may be signaled specific time instances, relative to some commonly understood reference time, that needs to be squelched as part of DCI information. Such time instances may also need to be compensated for due to differences in path delays and delay spread. For example, DCI may indicate that 1 μs of samples may need to be squelched beginning 200 s from the beginning of the $1^{st}$ slot carrying the DCI.

Embodiments for signaling squelching information to/from WTRU are described herein. To support network aided pulse detection and squelching, squelching related information may need to be included and interchanged between a BS (e.g., gNB) and WTRUs. For example, signaling from the BS (e.g., gNB) or a radar detector to WTRU can be performed through broadcast using, but not limited to SIB data or PDSCH specified for one or more WTRUs. The information carried may include interferer location and interferer descriptor. For example, the former may be used by WTRUs to support nulling as well as provide WTRUs with AoA information which can be taken advantage of when setting the squelching threshold. The interference descriptor may include information such as PRF, pulse width, in-beam duration, and power statistics. If there are multiple interferers, then there may also be more than one descriptor. Alternatively or additionally, DCI which is transmitted by a BS (e.g., gNB) and used to hold scheduling information, can be modified to also indicate when squelching needs to be performed by the WTRU or indicate that squelching needs to be used if a specific criterion is met. Furthermore, DCI may also be used to trigger the WTRU to perform new measurements or sensing to gather or identify interferers. In addition to DCI indicated measurement times, a new configuration of CSI-IM patterns may be used to support non-synchronous timing of interferer pulse patterns with non-integer number of symbol times indicated.

Similar to how channel state information is reported to a BS (e.g., gNB) from WTRU, the WTRU may be required to inform the BS (e.g., gNB) about identified radar interference. Interference timing can be reported with values on a per symbol basis over a complete slot, where modifications are necessary to achieve a sub symbol duration interference measurement. Specifically, the timing indication of an interference pulse can be put in terms of its start-stop timing instances. In case of the one-shot pulse detector this would correspond to when the signal power is registered to exceed the threshold (e.g., start), to when it once again falls below the threshold (e.g., stop). A measurement report can then be formed from such data and sent to the BS (e.g., gNB). The WTRU can also be configured to perform time-frequency measurement to identify interference. The WTRU may then instead of just reporting the time of the pulse, construct a time-frequency rectangle around the pulse subject to some predefined granularity (dt, df) and report it to the BS (e.g., gNB).

Embodiments for multi-shot pulse detection are described herein. The one-shot pulse detector does not make use of a priori radar knowledge and may thus result in many additional samples being marked as interference corrupted and letting some overly corrupted samples through. For example, knowing that there is at most one radar pulse per time-window, detecting two pulses would mean that one of them is not due to the radar. Identifying these incorrectly marked samples can help reduce the false alarm rate of the pulse detection. In the multi-shot radar pulse detection, the one-shot pulse detector can be used as input to further processing to estimate PRF and PRF phase (i.e., delay to first pulse) to gain additional knowledge of the radar. For example, even if the pulse detector operates on a per symbol basis, a time history of peak locations and powers can be collected over many slots. Then, a spectral analysis (e.g., FFT, matched filter banks, or Neural Networks (NNs)) can be used to combine all pulse detector data and estimate a pulse width, PRF and PRF phase. This information can be acquired and utilized within the pulse detection itself or within the squelching portion of the processing.

Embodiments for threshold setting based on allocated/granted BW and target SIR are described herein. In this case, the receiver may perform a spectral analysis of the interference pulse(s) to estimate the interference frequency domain location. For example, the carrier and BW and other spectrum information is estimated and compared to RBs that need to be decoded. The amount of frequency domain 'overlap' between the desired signal and interference can be used to adjust the threshold for squelching. For example, if the radar is well separated from the desired RBs, then a higher threshold for squelching may be used. Alternatively or additionally, the radar spectral information may be provided by an external radar sensor. The external sensor may have a network connection the DU of the BS (e.g., gNB) and receive messages that indicate properties of the radar. The radar spectrum usage (e.g., center frequency and bandwidth, or PSD) may be included in the messages. The DU may forward this information, possibly processed, to the RUs. The radar spectrum information may be incorporated in the algorithms that determine which samples of the received data stream needs to be marked as interference corrupted. For example, if the radar center and BW is known, the effective SIR in the RBs of interest can be approximated as Seff/Ieff where Seff=Stot*(WTRU-RBs in radar/WTRU-RBtotAlloc) and Ieff=Itot*(radar RBs in WTRU-RBs/radar BW). This may, for example, be incorporated into the threshold margin factor as illustrated in FIG. 9. On the threshold, the Overlap Scale (OS) is (radar RBs in WTRU-RBs/radar BW)/(WTRU-RBs in radar/WTRU-RBtotAlloc). The SCF split 6 interface or the O-RAN 7.2 split interface can be used to transfer radar descriptors.

Figure 11:
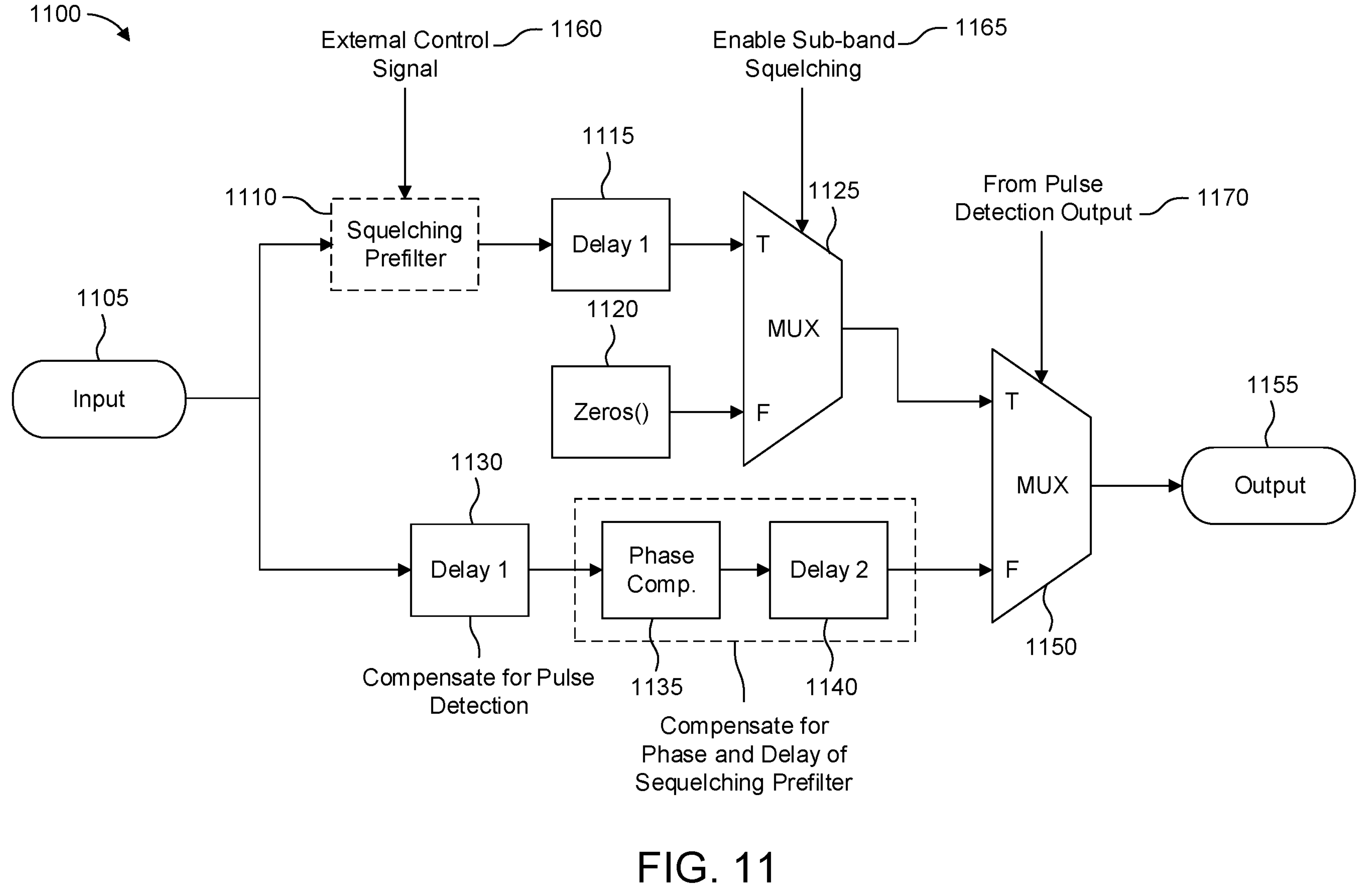
FIG. 11 is a diagram illustrating an example squelching.

Embodiments for squelching are described herein. FIG. 11 is a diagram illustrating an example squelching 1100, which may be used in combination with any of other embodiments described herein. Squelching may refer to replacing either time-domain samples by zeros or replacing time-frequency domain samples by squelching prefilter output or other appropriate values. A block diagram of the squelching process is illustrated in FIG. 11, where the input and output correspond to those shown for the squelching block in FIG. 5. As illustrated in FIG. 11, input signal samples 1105 may be selected, based on the pulse detection output 1170, via two streams: an upstream comprising a squelching prefilter 1110, delay 1 1115, zeros( ) 1120, a multiplexer 1125; and a downstream comprising delay 1 1130, phase compensation 1135, and delay 2 1140. When the pulse detection output 1170 is false (i.e., no interference signal is detected), delay 1 1130 is added to an input signal sample 1105 to compensate for the pulse detection. The phase compensation 1135 and delay 2 1140 is performed to compensate for the phase and delay of the squelching prefilter 1110. Thus, non-interfered signal sample is selected to the output 1155. When the pulse detection output 1170 is true (i.e., interference is detected) but the enable sub-band squelching 1165 is false, the zero( ) 1120 send 0 (i.e., wideband squelching) to the output 1155. However, when the pulse detection output 1170 is true and the enable sub-band squelching 1165 is true, the squelching prefilter 1110 may set the interference signal sample to a prefiltered version of wideband signal (i.e., sub-band squelching) based on the external control signal such as an interference center frequency and an interference bandwidth. The prefiltered version of the wideband signal with delay 1 1115 is provided to the output 1155. Thus, based on the signal samples received from the upstream and the downstream, output 1155 may be generated with one or more non-interfered signal samples and one or more interfered signal samples set to zero or a prefiltered version of wideband signal.

In an example where a receiver receive five symbols with interference signals at the fourth and fifth symbols, the pulse detection output 1170 is false for the first three samples corresponding the first three symbols. Each of the first three samples is processed by delay 1 1130, phase compensation 1135 and delay 2 1140 for the output 1155. For the fourth and fifth symbols, the pulse detection output 1170 is true. If the enable sub-band squelching 1165 is false, the fourth and fifth samples corresponding the fourth and fifth symbols are set to zeros. These zeros are provided to the output 1155. Thus, the output 1155 includes three non-interfered signal samples and two zeros. If the enable sub-band squelching 1165 is true, the fourth and fifth samples corresponding the fourth and fifth symbols are set to a prefiltered version of wideband signals determined by the squelching prefilter 1110. These prefiltered versions of wideband signals with delay 1 1115 are provided to the output 1155. Thus, the output 1155 includes three non-interfered signal samples and two prefiltered versions of wideband signals.

Embodiments for physical channel specific squelching are described herein. As signal structures and waveforms may differ between different physical channels, pulse detection and squelching may be tailored for the specific applications in order to optimize performance.

Embodiments for squelching within the physical random access channel (PRACH) are described herein. In the following, one embodiment of pulse detection and squelching is described for PRACH. PRACH preamble detection may be correlation-based which means that the interference from even a time limited radar signal will impact all samples. Additionally or alternatively, if the radar occupies a large portion of the PRACH allocated frequency resources, filtering out the radar may substantially reduce the detection performance. Hence, the time-domain squelching approach is very fitting for the PRACH when subject to pulse radar interference. In this embodiment, the prefilter for the pulse detection may include a bandpass filter. The goal of the filter is twofold. Firstly, it may aim to remove all except the PRACH occupied REs. This may be needed as there can be significant power difference between PRACH and other uplink channels, meaning even though PRACH may experience the radar signal to have substantial power, it may not seem significant for PUSCH or PUCCH. Secondly, its aim may be to remove the radar interference completely if the radar bandwidth does not overlap with that of PRACH. This is desirable as it may inhibit squelching from being applied unnecessarily. Assuming the radar out of band interference is negligible, this may entail that there will not be any reduction in PRACH preamble detection performance when radar is not overlapping directly with the PRACH band.

Embodiments for squelching within the physical shared channel are described herein. The physical shared channel may include, but is not limited to, a physical uplink shared channel (PUSCH), a physical downlink shared channel (PDSCH), a physical uplink control channel (PUCCH) and a physical downlink control channel (PDCCH).

The physical uplink/downlink shared channel (PxSCH) is mainly used for data transmission. The PxSCH may also include a portion allocated for a reference signal denoted DMRS used for correct demodulation of the transmitted data. Interference within the DMRS in comparison to the data portion of the signal is more encumbering for system performance as its effect will impact the whole demodulation process. Hence, in one embodiment it is suggested that the threshold for pulse detection is set differently for the DMRS portion of the signal. For example, if the DMRS is less sensitive to a particular type of pulse interference, the threshold may be set higher so that unnecessary squelching is not performed. In contrast, if DMRS is more susceptible to a particular type, squelching may be enabled at a lower threshold. To enable this feature, radar parameters may be provided to the squelching process either through external radar sensors, the network or estimated using the received signal.

Figure 12:
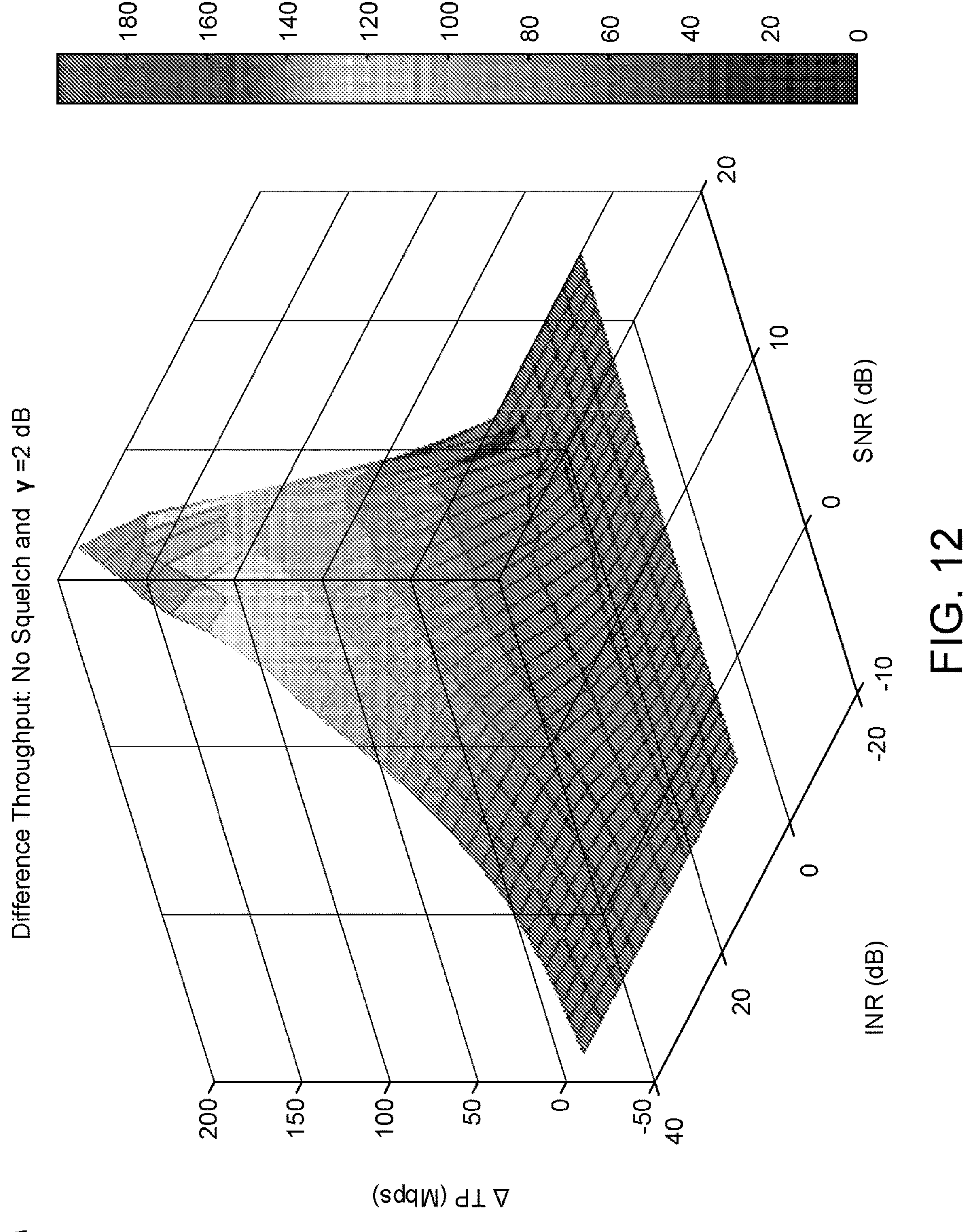
FIG. 12 is a diagram illustrating an example difference in throughput between wideband squelching and no squelching as a function of Interference to Noise Ratio (INR) and SNR.

Embodiments for wideband squelching are described herein. FIG. 12 is a diagram illustrating an example difference in throughput between wideband squelching and no squelching as a function of Interference to Noise Ratio (INR) and SNR, which may be used in combination with any of other embodiments described herein. Wideband squelching may refer to the squelching version where the signal is squelched in the time-domain using zeros without any attempt to limit the impact of squelching to RBs that are not impacted by radar. The squelching may also be applied the same for all physical channels in the given signal processing chain and add very little complexity to the system. On the other hand, the squelching may not be optimal for all physical channels having reduced performance in comparison to other approaches. Nevertheless, compared to not addressing the radar interference at all, wideband squelching can be seen as a substantial improvement as evident by the simulation results provided in FIG. 12.

In FIG. 11, the timing of the interference effected samples may be provided by the pulse detection 1170, and delay 1 1130 may be added to the input signal in order to compensate for any latency introduced by the pulse detection 1170. The squelching may be performed by switching in zeros instead of the corrupted samples as illustrated by the MUX 1125 in FIG. 11, when sub-band squelching is disabled (i.e., enable sub-band squelching 1165 is false).

Since the squelching has reduced the energy in some symbols by some number of samples, $N_{squelch}$, the signal level after FFT may be reduced for certain REs. This can be problematic if some symbols are squelched and other symbols are not and if some REs are squelched and other are not within a transport block, particularly for higher order modulations, for example, 64QAM and 256QAM, since ideal decision boundaries for soft symbol demapping will be different in different symbols and depend on whether or not a DMRS symbol was squelched. To compensate, a gain of $N_{tot}/(N_{tot}-N_{squelch})$ may be applied to the REs (or the inverse applied to the decision boundaries). In this case, the gain may be more conveniently applied after the FFT.

Embodiments for sub-band squelching are described herein. In sub-band squelching, instead of replacing the radar corrupted samples by zero, the radar samples may be replaced by samples taken from the prefilter which is configured to reject the portion of the frequency band that includes the radar pulse interference. This corresponds to having the optional squelching prefilter configure as a band-stop filter and the sub-band squelching control signal enabled in FIG. 11. The radar pulse parameters, obtained from external radar sensor, the network or estimated using the received signal, may be provided to the prefilter through the external control signal. This may enable the filter to be adjusted during operation based on possible changes in the radar signal. In the case of sub-band squelching, the input signal coming from the prefilter may have an added delay and possibly also an altered phase in comparison to the unfiltered input. For this reason, the input signal may have the added phase compensation block and delay block delay 2 to align the timing of the signals for switching. Alternatively or additionally, due to latency added by the pulse detection, both input signals may have the added delay block delay 1, in order to compensate for this timing discrepancy.

Figure 13:
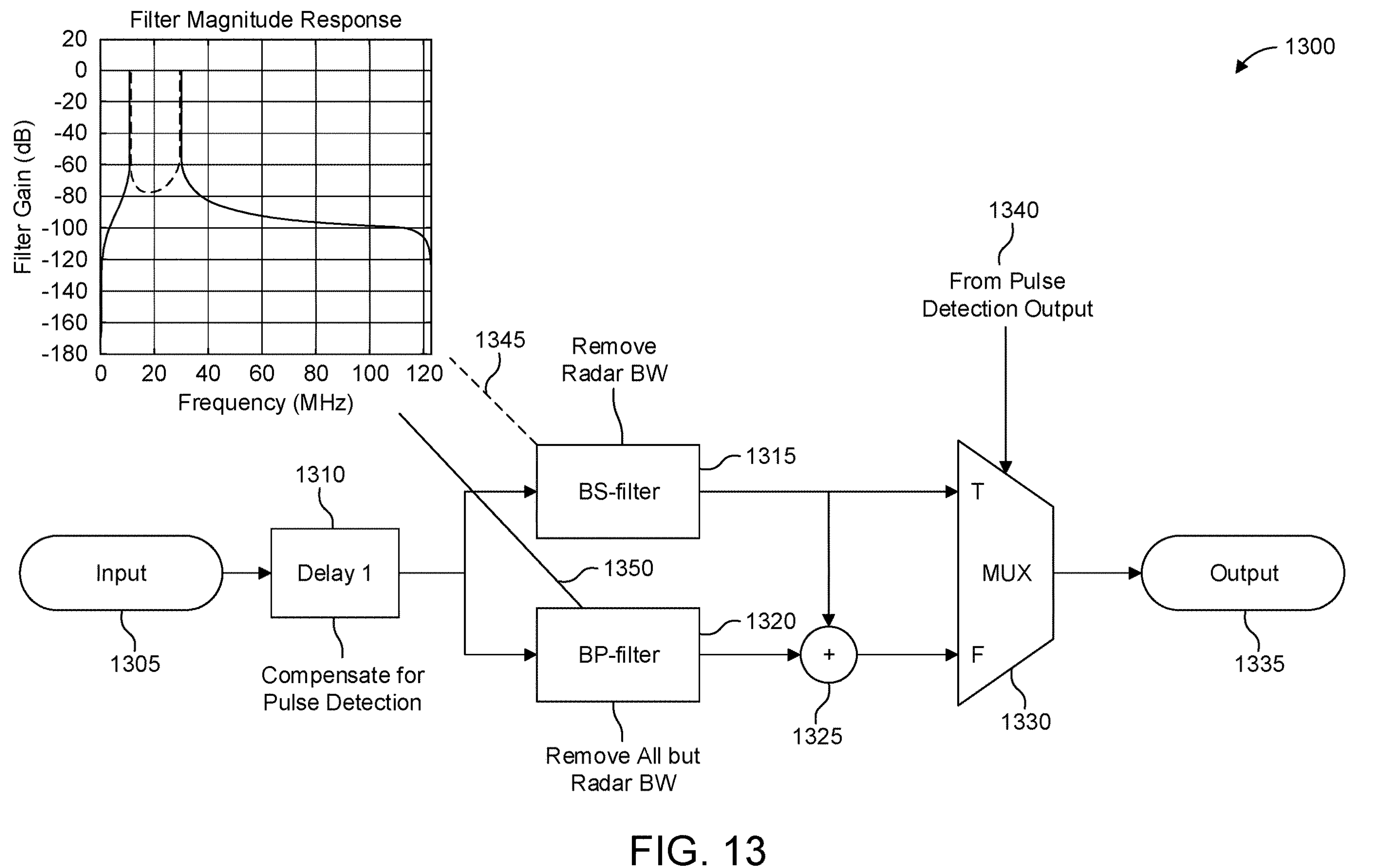
FIG. 13 is a diagram illustrating an example sub-band squelching where phase distortion and time delay is compensated by adding an additional bandpass filter.

FIG. 13 is a diagram illustrating an example sub-band squelching 1300, which may be used in combination with any of other embodiments described herein. An alternative or additional way of implementing the sub-band squelching is shown in FIG. 13, where a bandstop filter (BSF) and a bandpass filter (BPF) have been placed in parallel. As illustrated in FIG. 13, delay 1 1310 may be added to the input signal samples 1305 to compensate for the pulse detection delay. When the pulse detection output 1340 is true (i.e., interference signal is present), the multiplexer 1330 receives the result of the bandstop filter (BSF) 1315 that passes all the frequencies except the interference frequency (i.e., removing radar bandwidth). The result of the BSF 1315 is sent to the output 1335. When the pulse detection output 1340 is false (i.e., interference signal is not present), the multiplexer 1330 receives the combined result 1325 of the bandstop filter (BSF) 1315 and band pass filter (BPF) 1320. The BPF 1320 does not passes all the frequencies except the interference frequency (i.e., allowing radar bandwidth). Since the BSF 1315 may remove the non-interfered signal samples, the result of BSF 1315 and the result of BPF 1320 need to be combined to generated a complete band at 1325. The combined result of the BSF 1315 and BPF 1320 is sent to the output 1335.

This setup may provide a simple implementation of the phase and delay compensation mentioned above and reduce the impact of the switching. The filters may be configured to be identical except that one is a BSF, and the other is a BPF. As illustrated in FIG. 3, this may entail that the combined effect of the filter outputs is that of an all-pass filter covering the complete frequency range. However, when interference is detected, only the BSF output may be forwarded.

In sub-band squelching, the desired signal power may be estimated in each time-window as in wideband squelching. There may also be additional bandpass prefiltering used for the pulse detection so that signal power measurements focus on the radar carrier and BW. Similarly, the radar power measurements may use filtering to focus the measurement on the spectrum used by the desired signal. If the estimated ISR is above a threshold, then the squelching pulse may be passed to the mux that switches to the band reject filtered signal. The filter delay and phase may be constructed to be the same as the delay block as illustrated in FIG. 13 to eliminate any discontinuities from the switching. As a further enhancement, if the ISR is very high the squelching control signal may be extended, for example, if the channel multipath has some long delay weak paths, it may be beneficial to squelch all the way out to the last detectable path.

Figure 14:
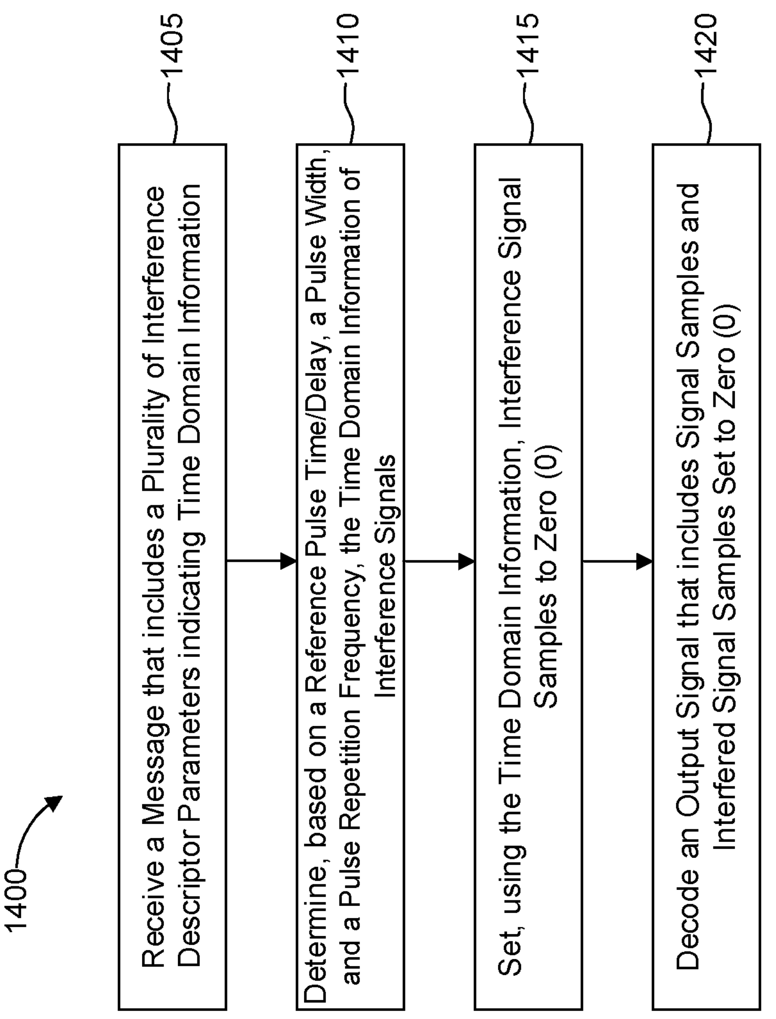
FIG. 14 is a diagram illustrating an example wideband squelching procedure.

FIG. 14 is a diagram illustrating an example wideband squelching procedure 1400, which may be used in combination with any of other embodiments described herein. At step 1405, a WTRU may receive, from a base station (BS) or an external radar detector, a message that includes a plurality of interference descriptor parameters indicating time domain information of one or more interference signals. The message may be received via broadcast transmission (e.g., system information), multicast transmission, and/or unicast transmission (e.g., DCI). The plurality of interference descriptor parameters may include, but are not limited to, a reference pulse time/delay (or first pulse delay), a pulse width, and a pulse repetition frequency (PRF). Alternatively or additionally, the plurality of interference descriptor parameters may include a rotation envelop peak time/delay, rotation envelop peak duration, and a rotation period. At step 1410, the WTRU may determine, based on the reference pulse time/delay (or first pulse delay), the pulse width, and the pulse repetition frequency (PRF), the time domain information of one or more interference signals. Alternatively or additionally, the WTRU may use the rotation envelop peak time/delay, the rotation envelop peak duration, and the rotation period to determine the time domain information of the one or more interference signals. The rotation envelope peak time/delay may be inferred from the reference pulse time/delay. The time domain information may be short-time scale time domain information and/or long-time scale time domain information. The short-time scale time domain information may include a reference pulse time/delay, a pulse width, and a pulse repetition frequency (PRF). The long-time domain information may include a rotation envelope peak time/delay, a rotation envelope duration, and a rotation period. At step 1415, the WTRU may set, from a plurality of input signals, using the time domain information determined based on the reference pulse time/delay, the pulse width, and the PRF, one or more interfered signal samples in the plurality of input signals to zero (0). The WTRU may set the one or more interfered signal samples to zero (0) based on that the WTRU is incapable of a prefilter operation or the WTRU is not equipped with the prefilter. The WTRU may set the one or more interfered signal samples to zero (0) for one or more uplink/downlink channels. At step 1420, the WTRU may decode an output signal generated from the plurality of input signals. The output signal may include one or more non-interfered signal samples and one or more interfered signal samples set to zero (0) as described above. The output signal may be further processed by one or more downstream procedures to generate user date. The one or more downstream procedures may comprise at least one of Fast Fourier Transform (FFT), Channel Estimator, Equalizer, Demodulation, or Forward Error Correction.

Figure 15:
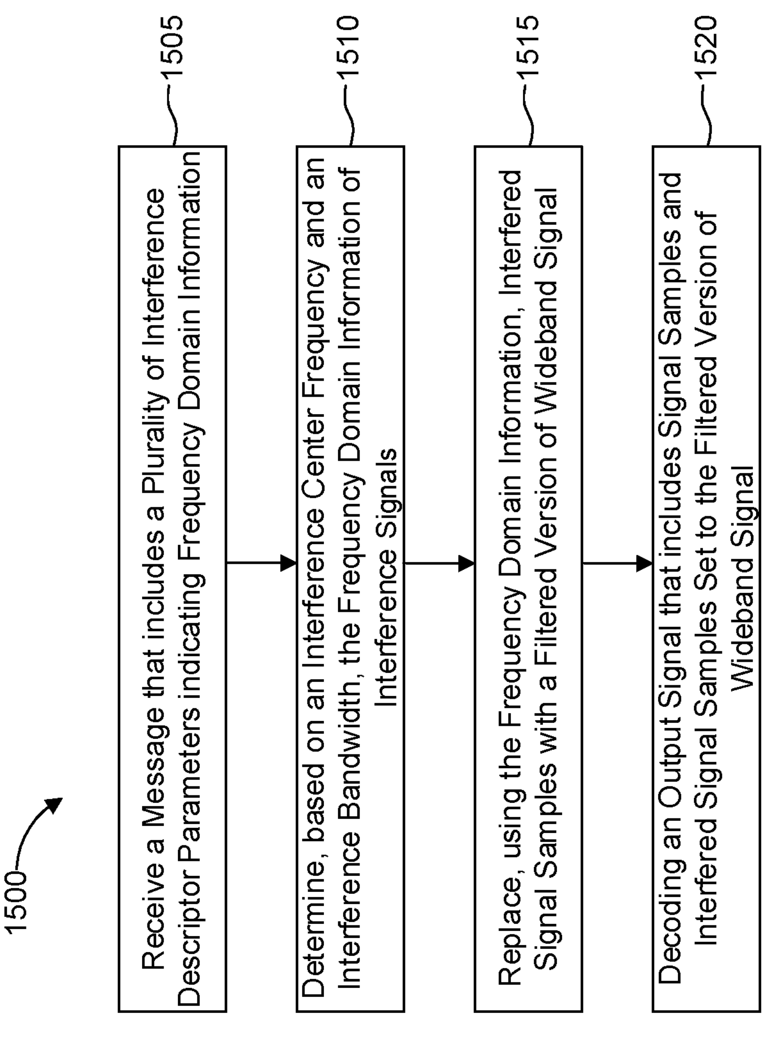
FIG. 15 is a diagram illustrating an example sub-band squelching procedure.

FIG. 15 is a diagram illustrating an example sub-band squelching procedure 1500, which may be used in combination with any of other embodiments described herein, At step 1505, a WTRU may receive, from a base station (BS) or an external radar detector, a message that includes a plurality of interference descriptor parameters indicating frequency domain information of one or more interference signals. The message may be received via broadcast transmission (e.g., system information), multicast transmission, and/or unicast transmission (e.g., DCI). The plurality of interference descriptor parameters may include, but are not limited to, an interference center frequency and an interference bandwidth (BW). At step 1510, the WTRU may determine, based on the interference center frequency and the interference bandwidth, the frequency domain information of the one or more interference signals. At step 1515, the WTRU may replace, from a plurality of input signals, using the frequency domain information, one or more interfered signal samples with a filtered version of Analog-to-Digital Converter (ADC) wideband signal. In order to generate the filtered version of the ADC wideband signal, the WTRU may suppress the one or more frequencies occupied by the one or more interference signals and apply a delay and phase compensation to the plurality of input signals. The WTRU may replace the one or more interfered signal samples with the filtered version of the ADC wideband signal based on that the WTRU is capable of a prefilter operation or the WTRU is equipped with the prefilter. At step 1520, the WTRU may decode an output signal generated from the plurality of input signals. The output signal may include one or more non-interfered signal samples and the one or more interfered signal samples set to the filtered version of ADC wideband signal. Similar to FIG. 14, the output signal may be further processed by one or more downstream procedures to generate user date. The one or more downstream procedures may comprise at least one of Fast Fourier Transform (FFT), Channel Estimator, Equalizer, Demodulation, or Forward Error Correction.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a wireless transmit/receive unit (WTRU), the method comprising:

receiving, from a base station (BS) or an external radar detector, a message that includes a plurality of interference descriptor parameters indicating time domain information of one or more interference signals, wherein the plurality of interference descriptor parameters include a reference pulse time/delay, a pulse width, and a pulse repetition frequency (PRF);

setting, from a plurality of input signals, using the time domain information determined based on the reference pulse time/delay, the pulse width, and the PRF, one or more interfered signal samples in the plurality of input signals to zero (0); and decoding an output signal generated from the plurality of input signals, wherein the output signal includes one or more signal samples and the one or more interfered signal samples set to zero (0).

2. The method of claim 1, wherein the plurality of interference descriptor parameters further include a rotation envelope peak time/delay, rotation envelope peak duration, and a rotation period.

3. The method of claim 2, further comprising:

determining, from the plurality of input signals, using the time domain information determined based on the reference pulse time/delay, the pulse width, the PRF, the rotation envelope peak time/delay, the rotation envelope peak duration, and the rotation period, the one or more interfered signal samples to zero (0).

4. The method of claim 2, wherein the rotation envelope peak time/delay is inferred from the reference pulse time/delay.

5. The method of claim 1, wherein the one or more interfered signal samples are set to zero (0) based on the WTRU being incapable of a prefilter operation.

6. The method of claim 1, wherein the one or more interfered signal samples are determined to be set to zero (0) for one or more uplink/downlink channels.

7. The method of claim 1, wherein the time domain information comprises short-time scale time domain information and long-time scale time domain information, wherein the short-time scale time domain information includes a reference pulse time/delay, a pulse width, and a pulse repetition frequency (PRF), and the long-time domain information includes a rotation envelope peak time/delay, a rotation envelope peak duration, and a rotation period.

8. The method of claim 1, wherein the output signal is processed by one or more downstream procedures comprising at least one of Fast Fourier Transform (FFT), Channel Estimator, Equalizer, Demodulation, and/or Forward Error Correction, to generate user data.

9. A wireless transmit/receive unit (WTRU) comprising:

a processor; and a transceiver, wherein:

the processor and the transceiver are configured to receive, from a base station (BS) or an external radar detector, a message that includes a plurality of interference descriptor parameters indicating time domain information of one or more interference signals, wherein the plurality of interference descriptor parameters include a reference pulse time/delay, a pulse width, and a pulse repetition frequency (PRF);

the processor and the transceiver are further configured to set, from a plurality of input signals, using the time domain information determined based on the reference pulse time/delay, the pulse width, and the PRF, one or more interfered signal samples in the plurality of input signals to zero (0); and the processor and the transceiver are further configured to decode an output signal generated from the plurality of input signals, wherein the output signal includes one or more signal samples and the one or more interfered signal samples set to zero (0).

10. The WTRU of claim 9, wherein the plurality of interference descriptor parameters further include a rotation envelope peak time/delay, rotation envelope peak duration, and a rotation period.

11. The WTRU of claim 10, wherein the processor and the transceiver are further configured to determine, from the plurality of input signals, using the time domain information determined based on the reference pulse time/delay, the pulse width, the PRF, the rotation envelope peak time/delay, the rotation envelope peak duration, and the rotation period, the one or more interfered signal samples to zero (0).

12. The WTRU of claim 10, wherein the rotation envelope peak time/delay is inferred from the reference pulse time/delay.

13. The WTRU of claim 9, wherein the one or more interfered signal samples are set to zero (0) based on the WTRU being incapable of a prefilter operation.

14. The WTRU of claim 9, wherein the one or more interfered signal samples are determined to be set to zero (0) for one or more uplink/downlink channels.

15. The WTRU of claim 9, wherein the time domain information comprises short-time scale time domain information and long-time scale time domain information, wherein the short-time scale time domain information includes a reference pulse time/delay, a pulse width, and a pulse repetition frequency (PRF), and the long-time domain information includes a rotation envelope peak time/delay, a rotation envelope peak duration, and a rotation period.

16. The WTRU of claim 9, wherein the output signal is processed by one or more downstream procedures comprising at least one of Fast Fourier Transform (FFT), Channel Estimator, Equalizer, Demodulation, or Forward Error Correction, to generate user data.

* * * * *